United States Patent
Zalewski

(10) Patent No.: US 8,246,454 B2
(45) Date of Patent: Aug. 21, 2012

(54) SYSTEM FOR CONVERTING TELEVISION COMMERCIALS INTO INTERACTIVE NETWORKED VIDEO GAMES

(75) Inventor: Gary M. Zalewski, Oakland, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 232 days.

(21) Appl. No.: 12/604,887

(22) Filed: Oct. 23, 2009

(65) Prior Publication Data
US 2010/0273553 A1 Oct. 28, 2010

Related U.S. Application Data

(60) Provisional application No. 61/183,539, filed on Jun. 2, 2009.

(51) Int. Cl.
*G06F 17/00* (2006.01)
(52) U.S. Cl. .......................................................... 463/31
(58) Field of Classification Search .............. 463/29–33, 463/42; 705/14; 725/42
See application file for complete search history.

(56) References Cited

U.S. PATENT DOCUMENTS

| | | | |
|---|---|---|---|
| 7,593,867 B2 * | 9/2009 | Deakin et al. ................. 705/26.1 |
| 7,861,150 B2 * | 12/2010 | Colle et al. ...................... 715/203 |
| 2002/0062481 A1 | 5/2002 | Slaney et al. .................... 725/42 |
| 2003/0229900 A1 * | 12/2003 | Reisman ........................... 725/87 |
| 2004/0031058 A1 * | 2/2004 | Reisman ......................... 725/112 |
| 2004/0148221 A1 | 7/2004 | Chu ................................ 705/14 |
| 2006/0159109 A1 | 7/2006 | Lamkin et al. |
| 2007/0043616 A1 | 2/2007 | Kutaragi et al. |
| 2008/0092158 A1 | 4/2008 | Bhatnagar et al. .............. 725/34 |
| 2008/0201736 A1 | 8/2008 | Gordon et al. ................... 725/34 |
| 2008/0320512 A1 | 12/2008 | Knight ............................ 725/32 |
| 2009/0028434 A1 | 1/2009 | Vanhoucke et al. |
| 2009/0089838 A1 | 4/2009 | Pino et al. ........................ 725/40 |
| 2009/0092374 A1 | 4/2009 | Kulas ............................... 386/95 |
| 2009/0099928 A1 | 4/2009 | Vasile ............................. 705/31 |
| 2009/0319672 A1 * | 12/2009 | Reisman ........................ 709/227 |
| 2009/0320073 A1 * | 12/2009 | Reisman ......................... 725/51 |
| 2011/0219419 A1 * | 9/2011 | Reisman ........................ 725/112 |

FOREIGN PATENT DOCUMENTS

WO WO03/102728 12/2003

OTHER PUBLICATIONS

International Preliminary Report on Patentability and Written Opinion for PCT/US2010/033291, mailed on Dec. 15, 2011.
International Preliminary Report on Patentability and Written Opinion for PCT/US2010/032445, mailed on Dec. 15, 2011.
Non-Final Office Action for U.S. Appl. No. 12/537,606 mailed on Nov. 7, 2011.

* cited by examiner

*Primary Examiner* — Ronald Laneau
(74) *Attorney, Agent, or Firm* — Martine Penilla Group, LLP

(57) ABSTRACT

Methods, systems, and computer programs for converting television commercials into interactive network video games are presented. In one method, a broadcast or streamed commercial is accompanied by an interactive segment. A media player coupled to the broadcast or streaming media source identifies the existence of the interactive segment and presents the user with an enhanced and interactive mini-game commercial that can be played with other "viewers" in a common or disperse demographic. Multiple methods for content delivery are provided, including a model where television commercial is inserted within consecutive frames of the television program, and a model where the commercial is overlaid on frames of the television program allowing the user to play the game while the television program is displayed. In a preferred embodiment, the termination of the interactive mini-game commercial is set within a fixed time period commensurate with traditional spot television advertising.

32 Claims, 20 Drawing Sheets

US 8,246,454 B2

SYSTEM FOR CONVERTING TELEVISION COMMERCIALS INTO INTERACTIVE NETWORKED VIDEO GAMES

CLAIM OF PRIORITY

This application claims priority from U.S. Provisional Patent Application No. 61/183,539, filed Jun. 2, 2009, and entitled "ADDITION OF SUPPLEMENTAL MULTIMEDIA CONTENT AND INTERACTIVE CAPABILITY AT THE CLIENT"; and U.S. patent application Ser. No. 12/537,606, filed Aug. 7, 2009, and entitled "ADDITION OF SUPPLEMENTAL MULTIMEDIA CONTENT AND INTERACTIVE CAPABILITY AT THE CLIENT" which are incorporated herein by reference.

BACKGROUND

1. Field of the Invention

The present invention relates to methods, systems and computer programs for adding content to streamed media, and more particularly, methods, systems and computer programs for embedding advertising within television programming.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. Online gaming is also possible, where a user can interactively play against or with other users over the Internet.

Today's game console is not used just to play games, but are used as a computing device that can access the Internet to search for content, browse for multimedia downloads, shop online music, videos or movies, participate in multiplayer games, enter virtual words, etc. Thus, a community of users is accessing online media, and this community of users has powerful computing devices and versatile interfaces. However, users are actively engaged while playing a game but become passive watchers while viewing downloaded media. Additionally, these powerful computing devices and versatile interfaces are used by a well known community of users, enabling new opportunities to improve the viewing of streamed media.

It is in this context that embodiments of the invention arise.

SUMMARY

Embodiments of the present invention provide methods, systems, and computer programs for converting television commercials into interactive network video games. In one method, a broadcast or streamed commercial is accompanied by an interactive segment. A media player coupled to the broadcast or streaming media source identifies the existence of the interactive segment and presents the user with an enhanced and interactive mini-game commercial that can be played with other "viewers" in a common or disperse demographic. Multiple methods for content delivery are provided, including a model where television commercial is inserted within consecutive frames of the television program, and a model where the commercial is overlaid on frames of the television program allowing the user to play the game while the television program is displayed. In a preferred embodiment, the termination of the interactive mini-game commercial is set within a fixed time period commensurate with traditional spot television advertising.

It should be appreciated that the present invention can be implemented in numerous ways, such as a process, an apparatus, a system, a device or a method on a computer readable medium. Several inventive embodiments of the present invention are described below.

In one embodiment, a method includes an operation to obtain a television program that lacks interactive capabilities. Further, the method obtains a television commercial, which includes an interactive network video game. Additionally, instructions for adding the television commercial to the television program are obtained. The instructions are used to combine the television program with the television commercial resulting in an interactive segment which responds to player input. The resulting interactive segment is displayed to a user to enable the user to play the interactive network video game. The television commercial can be inserted within consecutive frames of the television program, or can be overlaid on frames of the television program, allowing the user to play the game while the television program is displayed.

In another embodiment, a method includes an operation to obtain a media segment that lacks interactive capabilities and is defined for presentation at a display. Further, the method obtains an interactive package containing interactivity instructions for adding interactive functions to the media segment. The interactivity instructions include player input processing instructions as well as instructions for adding additional display elements to the media segment. Further, the method combines the media segment with the interactive package to obtain an interactive segment which is responsive to player input. In addition, operations of the method display the interactive segment while checking for the player input, and dynamically update the interactive segment being displayed in response to the player input. In another embodiment, a computer program embedded in a computer-readable storage medium, when executed by one or more processors, performs the method operations.

In yet another embodiment, a client device includes a commercial content manager, a content manager, and a display manager. The commercial content manager receives an interactive package from an interactive content server. The interactive package contains interactivity instructions for adding interactive functions to a media segment, where the interactivity instructions include player input processing instructions and instructions for adding additional display elements to the media segment. The content manager receives the media segment, which does not have interactive capabilities, and combines the media segment with the interactive package to obtain an interactive segment responsive to player input. Further, the display manager shows the interactive segment while checking for the player input. The content manager dynamically updates the interactive segment being displayed in response to the player input.

In yet another embodiment, an interactive content includes a user manager, a commercial manager, and a commercial delivery administrator. The user manager receives a request from a client device for an interactive package, which contains interactivity instructions for adding interactive functions to a media segment lacking interactive capabilities. The interactivity instructions include player input processing instructions and instructions for adding additional display elements to the media segment. The commercial manager selects an interactive package to be sent to the user, and the commercial delivery administrator sends the selected interactive package to the user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe a method and apparatus for delivering interactive multimedia content. It will be obvious, however, to one skilled in the art, that the present invention may be practiced without some or all of these specific details. In other instances, well known process operations have not been described in detail in order not to unnecessarily obscure the present invention.

Figure 1:
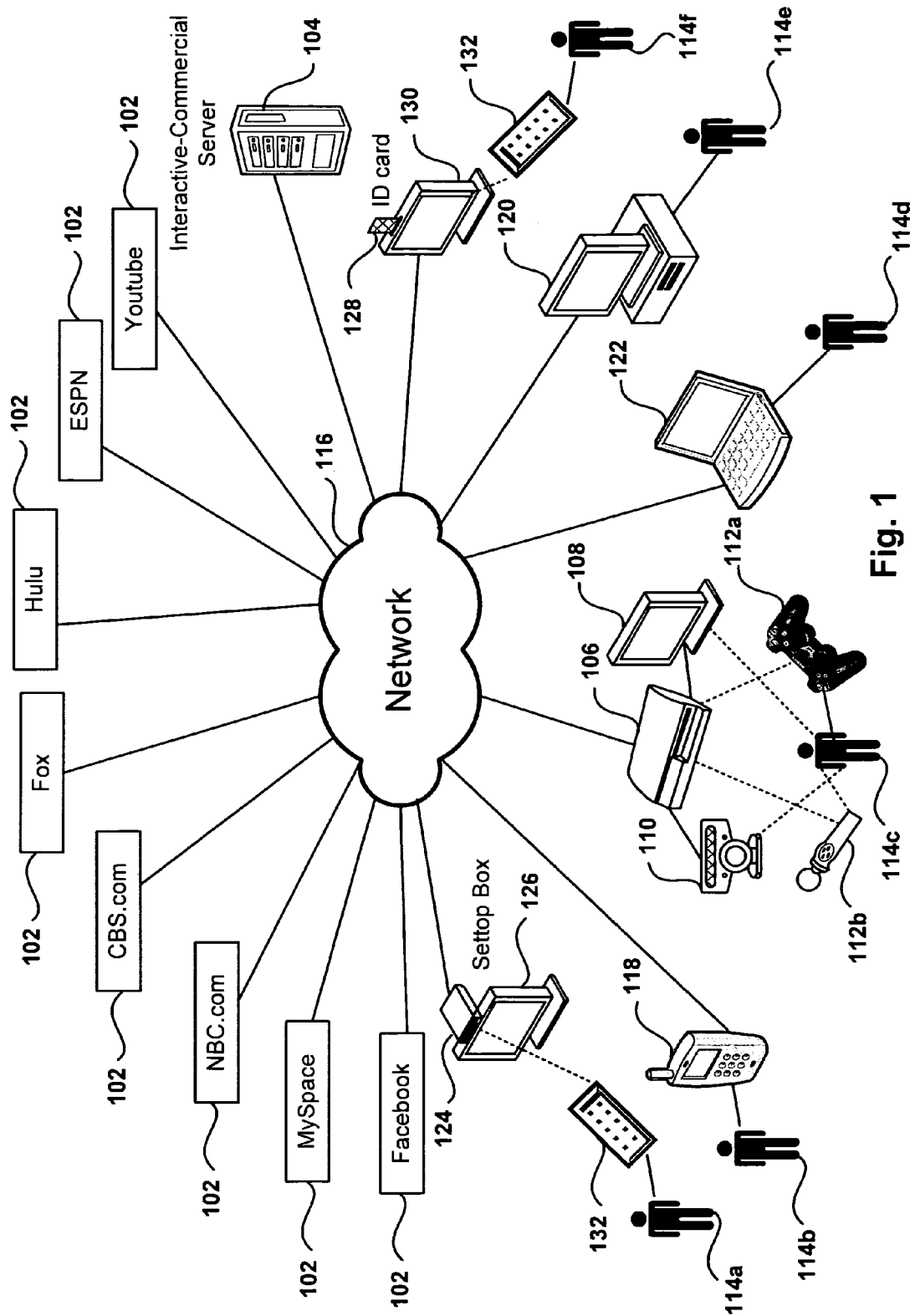
FIG. 1 shows a schematic diagram of a networked environment for delivery of multimedia content, according to one embodiment.

FIG. 1 shows a schematic diagram of a networked environment for delivery of multimedia content, according to one embodiment. Media 102, distributed through network 116, can be of several types, such as internet streamed media, broadcast media, on-demand media supplied by a cable company, photos posted on a social network, etc. A unique piece of downloaded media indented to be shown in its entirety to a user as a single unit is referred to herein as a media segment.

Different client devices are available for receiving the media content and displaying the media to users 114*a-f*. The client devices include set-top box 124 connected to a TV display, mobile phone 118, game console 106, laptop 122, Personal Computer 120, TV 130 configured with an ID card 128, etc. Additionally, users 114*a-f* interact with the different client devices in many ways, such as with remote control 132, voice commands, mobile-phone keys, camera 110 to capture user images in order to perform motion detection, game controllers 112*a-b*, keyboard, etc.

Interactive-Commercial (IC) Server 104 is in communication with the client devices to provide interactive content (IC) to the client devices. It should be noted that although some embodiments are described in reference to interactive advertising, the principles are also applicable to any form of user interaction inserted in a media segment. For example, the interaction can be used while viewing a movie to have the viewer participate in a war scene without the need to include advertising content. Further, the interactive content can be inserted between frames in the media segment, overlaid on top the media segment, or a combination of both. The interactive time can include a portion of the media segment, or can include the whole media segment. In fact, the media segment may already include interactive elements and other interactive elements may as well be added to those already existing in the media segment. The person skilled in the art in possession of this application will readily be able to apply the principles of the invention in a variety of scenarios, as long as the principles of the invention are followed. Additionally, interactive advertising can also be referred to herein as interactive commercials, interactive ads, interactive content, supplemental content, supplemental games, etc. Some of the objects inserted while displaying interactive advertising will be of a static nature, such as a text banner, while other contents may be dynamic, such as the display of a football game score, and yet other objects will be interactive and respond to user actions, such as a shooting target.

In one embodiment, the interactive content is inserted at the media source 102 or an intermediate server, and in another embodiment, the content is inserted at the client device interfacing with the user. Still yet, in another embodiment, some interactive content is included at the source while additional interactive content is added by the client device. For example, the interactive content can be a video commercial, a game, a computer program, a song, a photo, a document, a presentation, a billboard, a coupon, a video conference, etc. Additionally, the IC can be inserted between consecutive frames of the media stream, that is, the media stream viewing is temporarily halted while the user access the IC. The IC can also be displayed together with the media stream, such as a banner inside the viewing area, or a banner shown outside the display area of the video stream. In one embodiment, content provider 102 coordinates activities with IC server 104 for the placement of the interactive content, such as providing metadata for the placement of interactive commercials.

Figure 2:
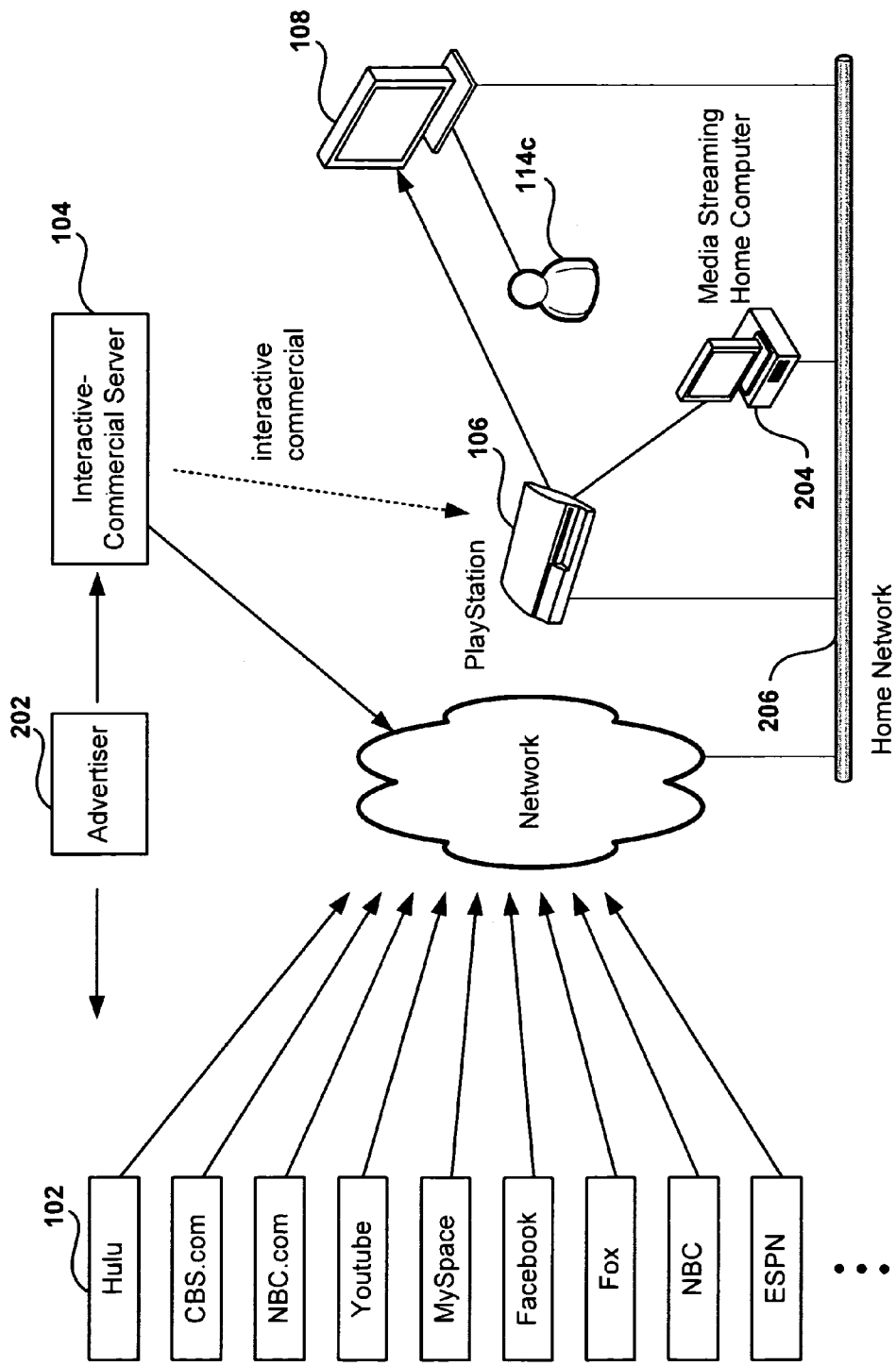
FIG. 2 illustrates the flow of content delivered in a network environment according to one embodiment of the invention.

FIG. 2 illustrates the flow of content delivered in a network environment according to one embodiment of the invention. Media providers 102 transfer content to PlayStation 106 which is then shown to user 114c on display 108. Home network 140 interconnects the difference devices within the home and includes a connection to the internet for communication with outside media providers 102. In one embodiment, devices in the home network support DLNA (Digital Living Network Alliance), which is a standard used by manufacturers of consumer electronics to allow entertainment devices within the home to share their content with each other across a home network without a complicated configuration process. Thus, home computer 142, which supports DLNA, downloads content from media providers 102 and makes the content available to PlayStation 106 via DLNA. Using DLNA's terms, home computer 142 acts as a Digital Media Server for PlayStation 106, which is the Digital Media Player. In another embodiment, Media providers 102 transfer content directly to PlayStation 106 via the network. Thus, user 114c with PlayStation 106 can view downloaded content without the need of a media streaming computer or other download device, such as a cable or satellite box.

A similar DLNA implementation currently available in the market is offered as a software package named PlayOn™, which runs on a PC and converts the PC into a Digital Media Server. A partial description for the implementation of PlayOn can be found in U.S. patent application Ser. No. 10/753,612, which is incorporated herein by reference.

Advertiser 150 coordinates activities with media providers 102 and Interactive Commercial Server (ICS) 104 for adding interactive content to the media provided by the media providers 102, to the IC provided by ICS 104, or to both. The client device, such as PlayStation 106, receives the media content and the IC, combines both, and then presents the combination to user 114c on display 108. The information sent from ICS 104 to the client device is sometimes referred to as an interactive packet. The interactive packet can include video clip, audio clip, object definition, insertion instructions (scheduling, duration, location on screen, insertion between media frames or overlay on top of media, demographics, number of insertion, frequency, etc.), programming instructions, input types, input processing, responses to inputs, random elements, communication information with other players in multi-player games, results server identification, instructions to download additional objects, etc. The object definition includes object shape, movement, size, interface with the object, inputs for controlling the object, object responses, relation with other objects, effect on game score, number of instances allowed in a single device, etc.

It should be appreciated that the embodiment illustrated in FIG. 2 is an exemplary addition of interactive commercial content. Other embodiments may utilize different types of interactive content which can be provided by other types of entities, such as news organizations, search engines, etc. The embodiments illustrated in FIG. 2 should therefore not be interpreted to be exclusive or limiting, but rather exemplary or illustrative.

Figure 3:
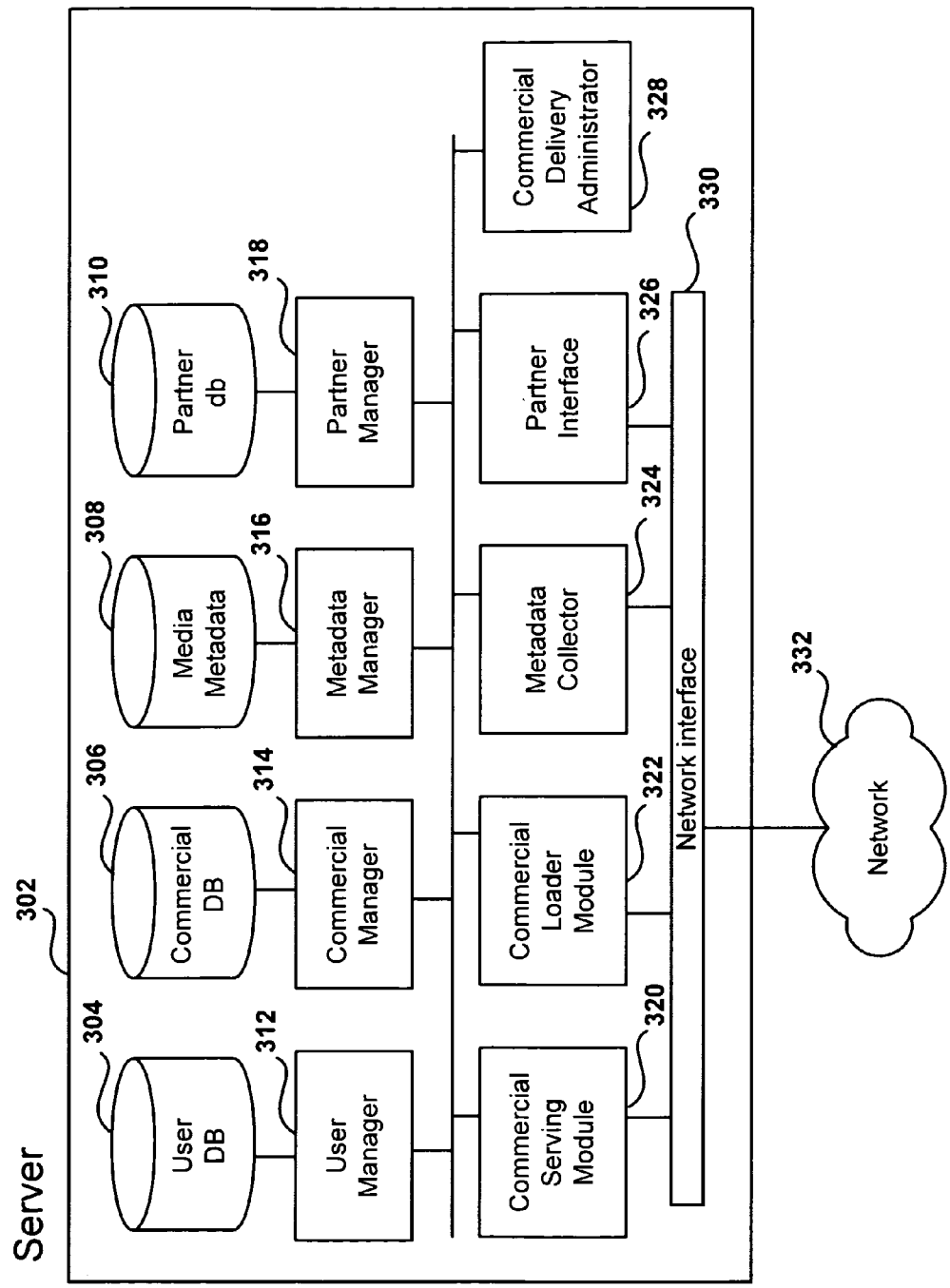
FIG. 3 depicts the Interactive Commercial Server architecture, according to one embodiment.

FIG. 3 depicts the Interactive Commercial Server (ICS) architecture, according to one embodiment. ICS 302 includes different databases, such as user database 304, commercial database 306, media metadata database 308, and partner database 310. User database 304 includes information about users associated with ICS 302. Some of the users have registered with ICS 302 and have a login and password that uniquely define the user within ICS 302. Other users have not registered with ICS 302, yet ICS may still contain information related to these users that has been collected over time. In one embodiment, ICS 302 indexes users in the database by a unique identifier associated with the client device, such as a serial number (S/N) of a game console or a PC. ICS 302 monitors activities or communications of each user to collect user information, such as the Internet Protocol address (IP), type of content downloaded, schedule, longevity in the system, etc. User database 304 is managed by user manager module 312 that receives information requests and provides information responses related to the users in user database 304.

Commercial database 306 holds information regarding interactive content and is managed by Commercial Manager 314. Media metadata database 308 holds information regarding media available for download to users in the system. For example, a sample media metadata for a TV episode can include title, description, actors, date first-time aired, location of commercials, locations of possible spots for IC placement, media content providers for the episode, etc.

Partner database 310 holds information about partners. This information includes partner id, partner category (such as media provider, advertiser, etc.), revenue sharing arrangements, IC provided, desired number of impressions for each piece of IC, etc. Partner database 310 is managed by Partner manager 318 that coordinates the collection and distribution of partner information.

Commercial Serving Module (CSM) 320 communicates with and transfers advertising to system users. For example, CSM 320 interfaces with the client device to download an interactive commercial to the client. The interactive commercial can be downloaded while the media content is being displayed, or can be downloaded in advance so the client is able to start showing the commercial without any delay. Commercial Loader Module 322 uploads IC from the network to place it in commercial database 306 and makes the IC available to users. For example, Commercial Loader Module 322 uploads games to commercial database 306.

Metadata collector 324 gets metadata information for media metadata database 308. Partner interface 326 interacts with partners for the coordination of retrieval of partner information, IC content provided by partners, accounting, reporting, etc. Further, Commercial Delivery Administrator 328 coordinates the activities related to IC within ICS server 302 and interfaces with other modules inside CSM 320. More details for Commercial Delivery Administrator 328 are shown in FIG. 4, including a description of the information flow between the different entities.

Figure 4:
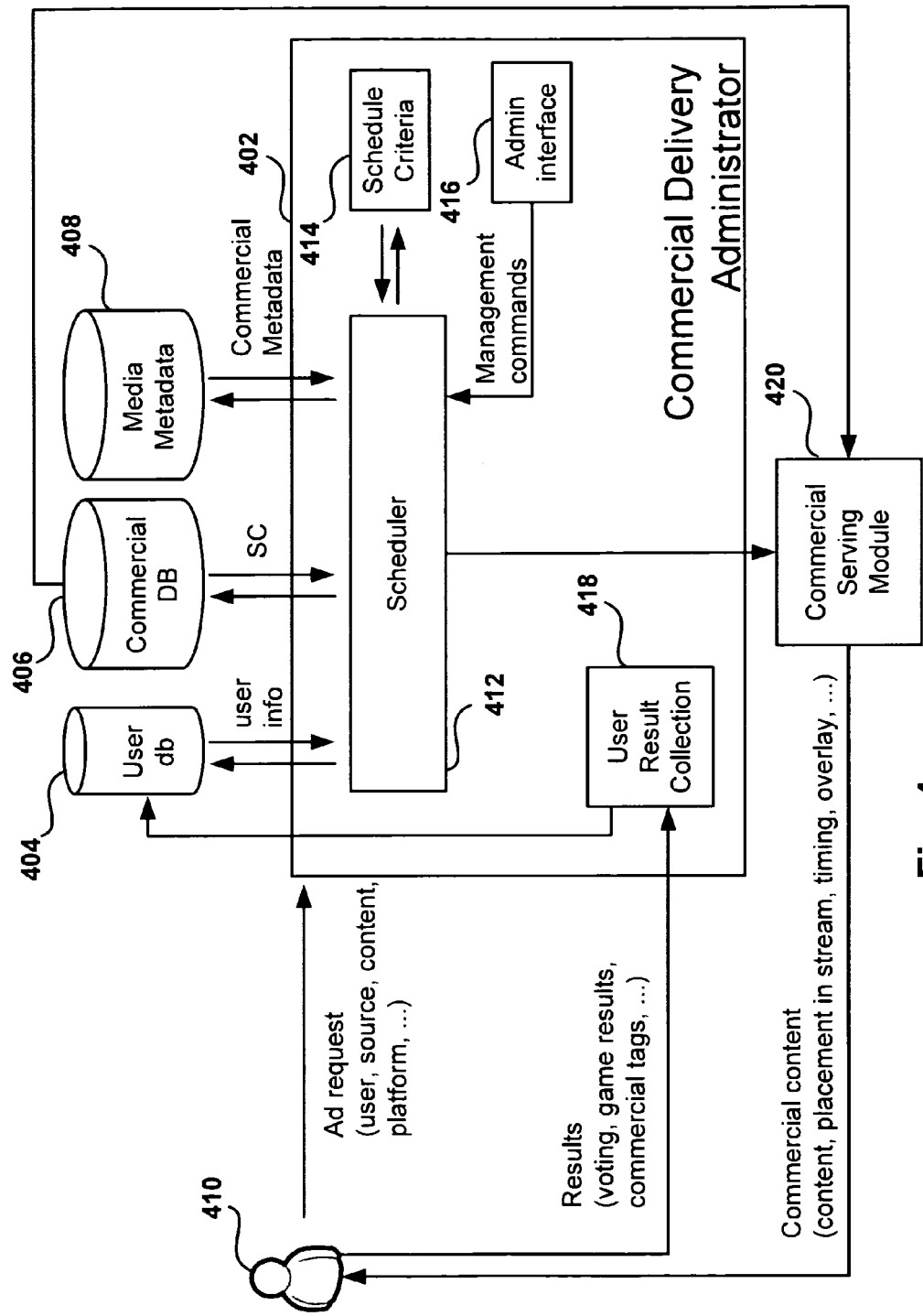
FIG. 4 illustrates the architecture of the Commercial Delivery Administrator in accordance to one embodiment.

FIG. 4 illustrates the architecture of the Commercial Delivery Administrator in accordance to one embodiment. When user 410 requests a media segment for display in the client system, the client sends an IC request to Commercial Delivery Administrator 402. In another embodiment, the client can receive IC independently from the client request for media, that is, the client system requests periodical updates to existing IC stored in the client system in order to download IC to the client to be readily available for presentation to the user.

The ad request may reach Commercial Delivery Administrator 402 via different communication channels, such as the Internet, a telephone modem connection, a satellite connection, a mobile phone network, a private network, etc. The request can be formatted using different protocols, such as html, XML, etc., or it can be formatted using a private protocol established between the client and the IC Server. The request includes information used by Commercial Delivery Administrator 402 to decide which IC to send to the client and the instructions for placement of the IC. The information in the request may include the user id, the client device id, the media content being downloaded, the media server providing the media content, the server downloading the content, the client device platform (PC, PlayStation™ 2, mobile phone, etc.), etc.

Scheduler 412 module inside Commercial Delivery Administrator 402 determines which IC to download and the instructions for placement of the IC. Scheduler 412 can be implemented in software, in hardware or in a combination of software and hardware. Further, Scheduler 412 can be distributed over several modules working in parallel or over multiple distributed servers that process requests from the multitude of users in the system.

The instructions for placement of the IC can include the desired time period for displaying the IC, the placement of the IC in the media segment being displayed, the type of IC being displayed, whether a response is expected from the client, etc. The instructions can be received in the form of formatted plain text, in a file, as a downloadable program (such as a Java applet) to be executed at the client, etc.

To determine which IC to serve, Scheduler 412 uses information from schedule criteria module 414. Schedule criteria 414 can be implemented as a shared data structure, a database, a lookup table, a hardware module, as a program running in the IC server, or as a combination thereof. Scheduler 412 communicates with the IC Server databases, such as user database 404, Commercial database 406, media metadata database 408, etc. User database 404 provides information about the user attached to the client device, such as age, geography, usage history, preferences, hobbies, purchasing history, IC interaction history, etc. In one embodiment, user database 404 keeps track of the ICs already delivered to the user in order to avoid sending IC already delivered to the user or to enable the user to recall a previously viewed IC. For example, a user may decide that she wants to take advantage today of a pizza coupon offered yesterday while watching a movie. User information in the user database may also be used to determine which IC is selected, such as selecting travel commercials for delivery to a travel enthusiast.

Commercial database 406 stores the IC and can be implemented within a file system in the server, as a distributed database spread out across multiple servers, as part of a Storage Area Network (SAN), etc. Commercial database 406 is configured to hold different types of content, such as video files, music files, program files, sound files, interactive object definitions, photos, etc. In one embodiment, commercial database 406 includes a cache for holding commercials being delivered to a large number of users in order to speed up delivery for commercials with high delivery requirements. Commercial database 406 can also have access to external content allowing the downloading of IC from external sources, such as the server of an advertiser that desires the flexibility of changing IC often for quick dissemination to users.

Media Metadata database 408 includes information, also referred to as metadata, about the media available for viewing by the users. The metadata may include sources for the media segments, media format, length of the media segment, type of content, interactive object definition, etc. The metadata provided by Media Metadata database 408 can be used by the scheduler to determine the instructions for the IC placement. For example, the metadata may indicate ten appropriate places for placing IC within the media segment, and Scheduler 412 may select two of the ten places for insertion of IC based on the length of the media segment. The metadata can also be used to define objects in the media in order to add interactive objects that coexist with the existing objects in the media. See for example the descriptions for FIGS. 10 and 11 below describing the inclusion of interactive objects in the media.

In one embodiment, Commercial Delivery Administrator 402 downloads some of the media metadata to remote clients in the background in order to allow remote clients to hold information about media available and information on how to access it. In yet another embodiment, Commercial Delivery Administrator 402 allows a remote user to browse the media database for finding media.

Once Scheduler 412 determines the IC to be downloaded, Scheduler 412 sends a command to Commercial Serving Module 420 to deliver the IC and instructions to the user. Commercial Serving Module 420 can be implemented within the same system as Commercial Delivery Administrator 402 or can be implemented as a group of distributed servers. This way, Scheduler 412 may select a Commercial Serving Module that is geographically close to the user, resulting in lower download latency.

In some cases, the delivery of IC at the client device generates results that are sent back to User Result Collection Module 418 within Commercial Delivery Administrator 402. Examples of results collected include voting for a particular event, score obtained after playing an IC game, tags indicating the location of commercials within the downloaded media, etc. The collected results can be stored in user database 404 when the results relate back to the user (such as number of points collected in a game), or can be saved in a results database (not shown) that can be accessed by administrators, advertisers, etc., for data analysis.

Administrator interface module 416 provides a user interface to enable the administrator to manage the scheduler. The administrator can enter priorities for the IC, updates to Schedule Criteria 414, instructions to upload new IC or delete old IC, etc.

Figure 5:
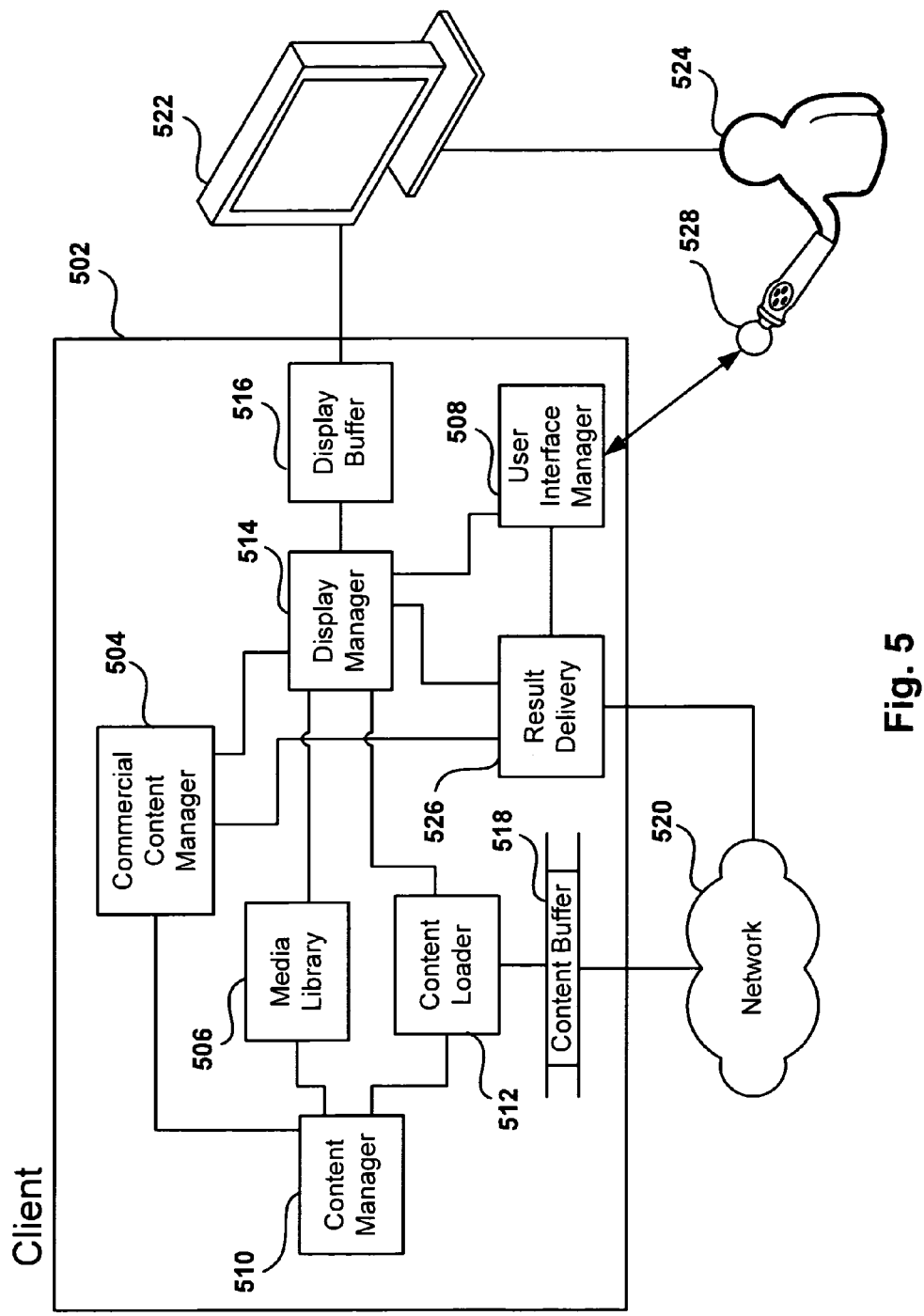
FIG. 5 illustrates the architecture for an embodiment of a client configured to deliver an interactive commercial.

FIG. 5 illustrates the architecture for an embodiment of a client configured to deliver interactive advertisement. Content Manager 510 determines how to retrieve content for the user. In one embodiment, the content can be obtained from an internal media library 506, or from the Internet via Content Loader 612. Content loader 512 downloads multimedia content via network 520, which is buffered by content buffer 518. Content Loader 512 can retrieve content for storage in the Media Library 506 for later retrieval by the user, offering DVR (Digital Video Recorder) capabilities. One advantage of using the Media Library together with Commercial Content Manager 504 is that the IC is added to the media at the time that the media is viewed by the user. Existing DVRs that record a TV program display 'old' commercials when the media is played. For example, if a TV show, including a commercial for another TV show on Tuesday, is recorded on Monday and later viewed on Thursday, the commercial displayed would be obsolete, as the Tuesday TV show being sponsored has already been shown when the user watches the ad on Thursday. However, by adding IC at the client at the time that the show is viewed, the IC system architecture allows for the replacement of old commercials ('stale') with 'fresh' relevant commercials, thus improving the effectiveness of commercials on viewers. Display Manager 514 receives the media from the Media Library and the IC from Commercial Content Manager 504 and combines them before placing the resulting combination in Display Buffer 516, which drives display 522. In another embodiment, the content in the library already includes IC, which has been inserted by the media publisher before download. In this case, display manager 514 may not add a new interactive commercial, although in some cases display manager 514 adds interactive content to supplement the IC delivered by the publisher.

User Interface Manager 508 receives input from user 524 which can come from a variety of devices, such as single-handed controller 528, or other devices such as a two-hand controller, a mobile phone, a remote control, a keyboard, etc. The user input is communicated to the display manager for further processing and updating of the video sent to display buffer 516. The user input may also be communicated to Result Delivery module 526 for transmission to a remote result collection module via network 520.

Figure 6:
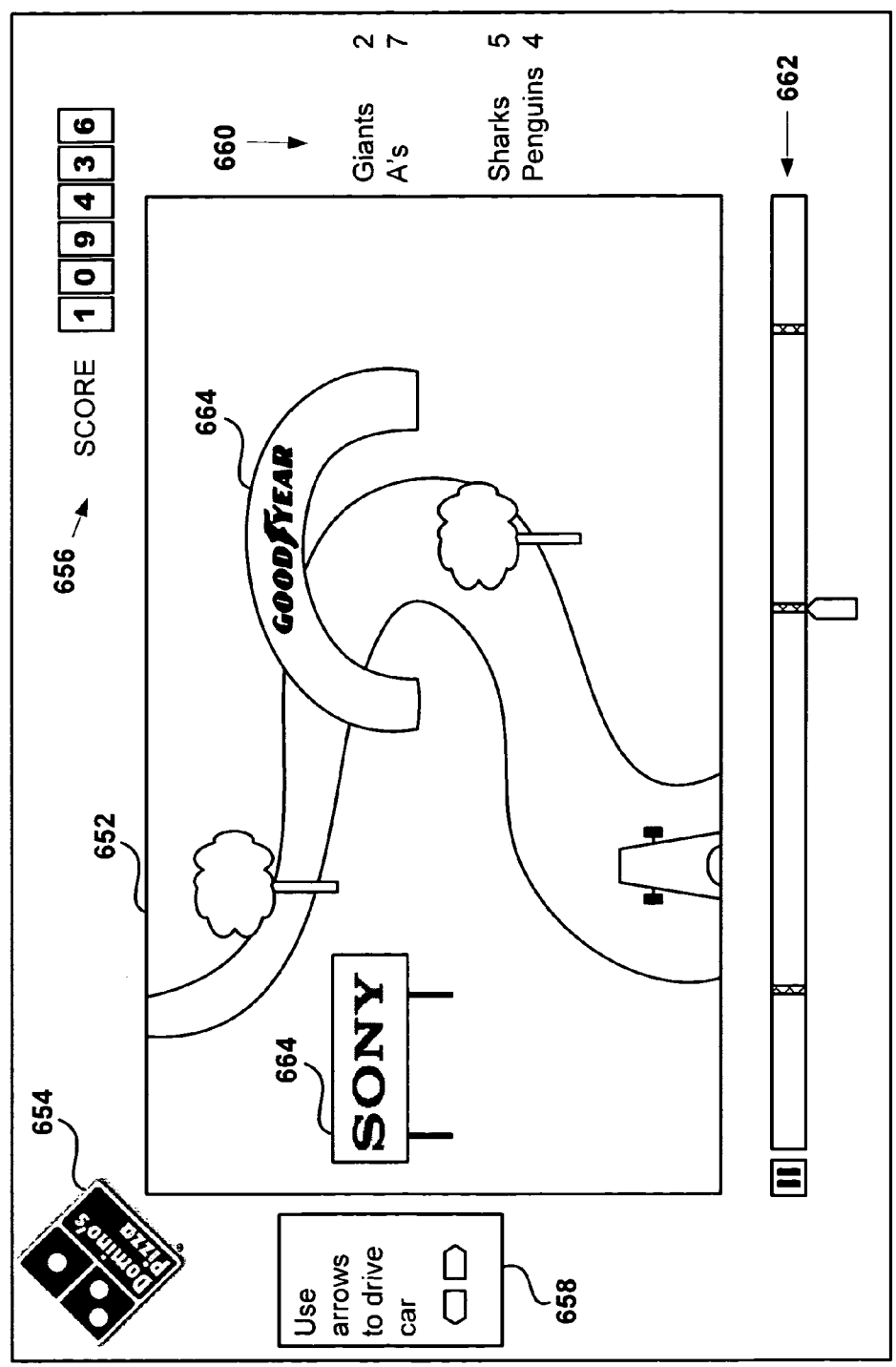
FIG. 6 depicts an embodiment of a user interface for displaying interactive advertisement.

FIG. 6 depicts an embodiment of a user interface for displaying an interactive commercial. The user interface of FIG. 6 includes a multimedia display area 652 for displaying video, filler video for music, a game display, email, a browser, etc. Video game playing area 652 includes embedded section 664 for displaying commercial advertisement or any types of supplemental content. Embedded section 664 can be a predefined section of the video game playing area 652, a rolling banner, a moving area within the display, etc.

Additional information is made available to the user by the client device outside video game playing area 652 such as commercial advertisement section 654, game information section 658, game score 656, news and scores 660, etc. Further, display information bar 662 provides details about the progress of the multimedia display, control buttons (pause, etc.), location of IC insertions, etc. During an interactive game the user has the option of playing for the minimum amount of time allotted for the display of the interactive commercial, or the option of continuing to play the game until the user makes an input to command the end of the game and the return to the multimedia display.

It should be appreciated that the embodiment illustrated in FIG. 6 is an exemplary layout for displaying media. Other embodiments may utilize different layouts, or may add other related fields. The embodiment illustrated in FIG. 6 should therefore not be interpreted to be exclusive or limiting, but rather exemplary or illustrative.

Figure 7:
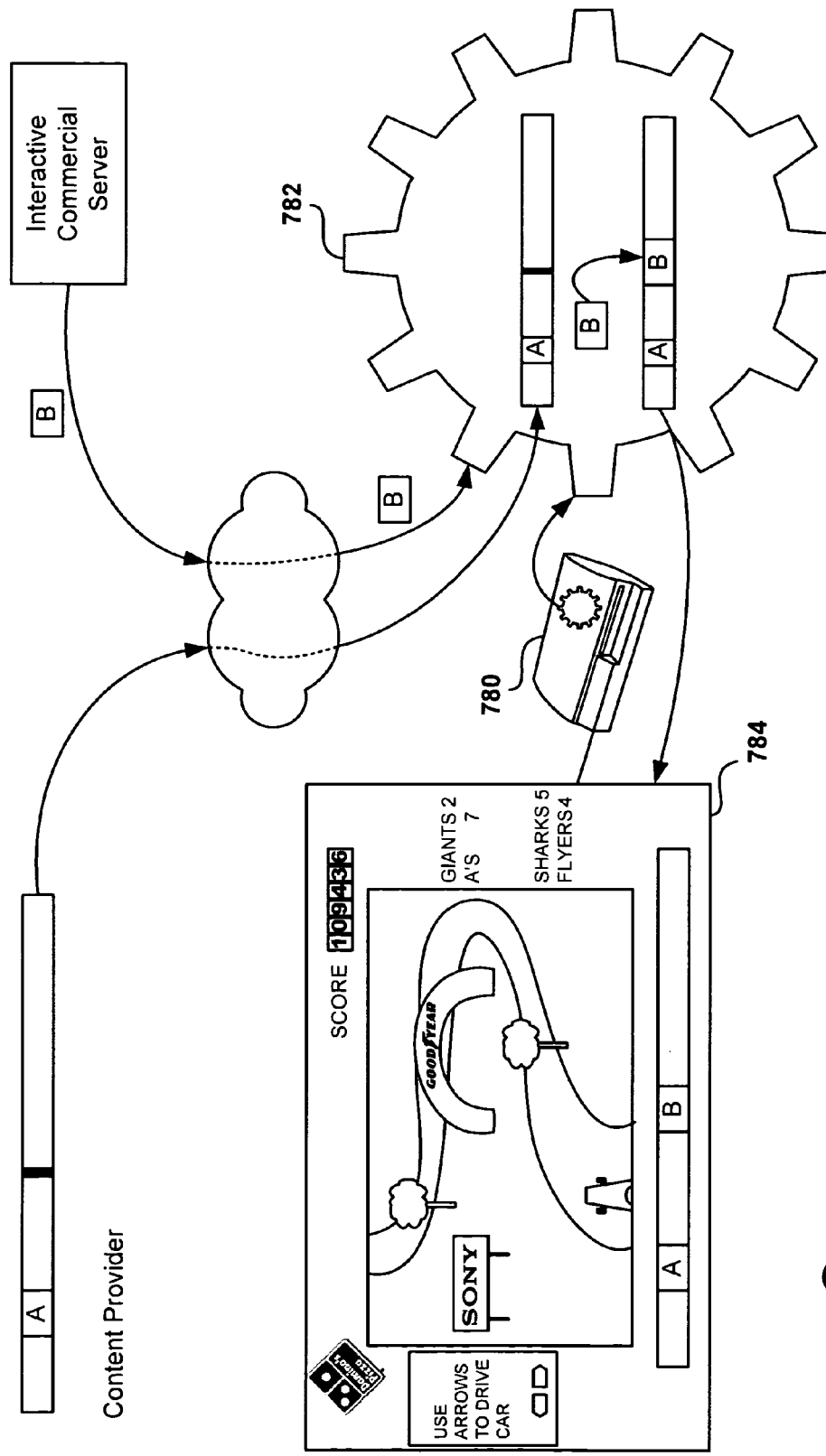
FIG. 7 illustrates how interactive content is inserted at the client, in accordance with one embodiment.

FIG. 7 illustrates how interactive content is inserted at the client, in accordance with one embodiment. IC Manager 782 in client device 780 downloads content, such as a television program, from a content provider and IC B, such as a network video game, from the IC Server. In one embodiment, IC Manager 782 adds IC B to the media downloaded from the content provider before showing it to the user in display 784. In another embodiment, interactive content A is already included with the downloaded media. Client device 780 detects IC A and manages interactions with the user during the display of IC A. In yet another embodiment, the complete content downloaded is interactive and client device 780 interacts with the user during the complete display of the downloaded media.

Figure 8:
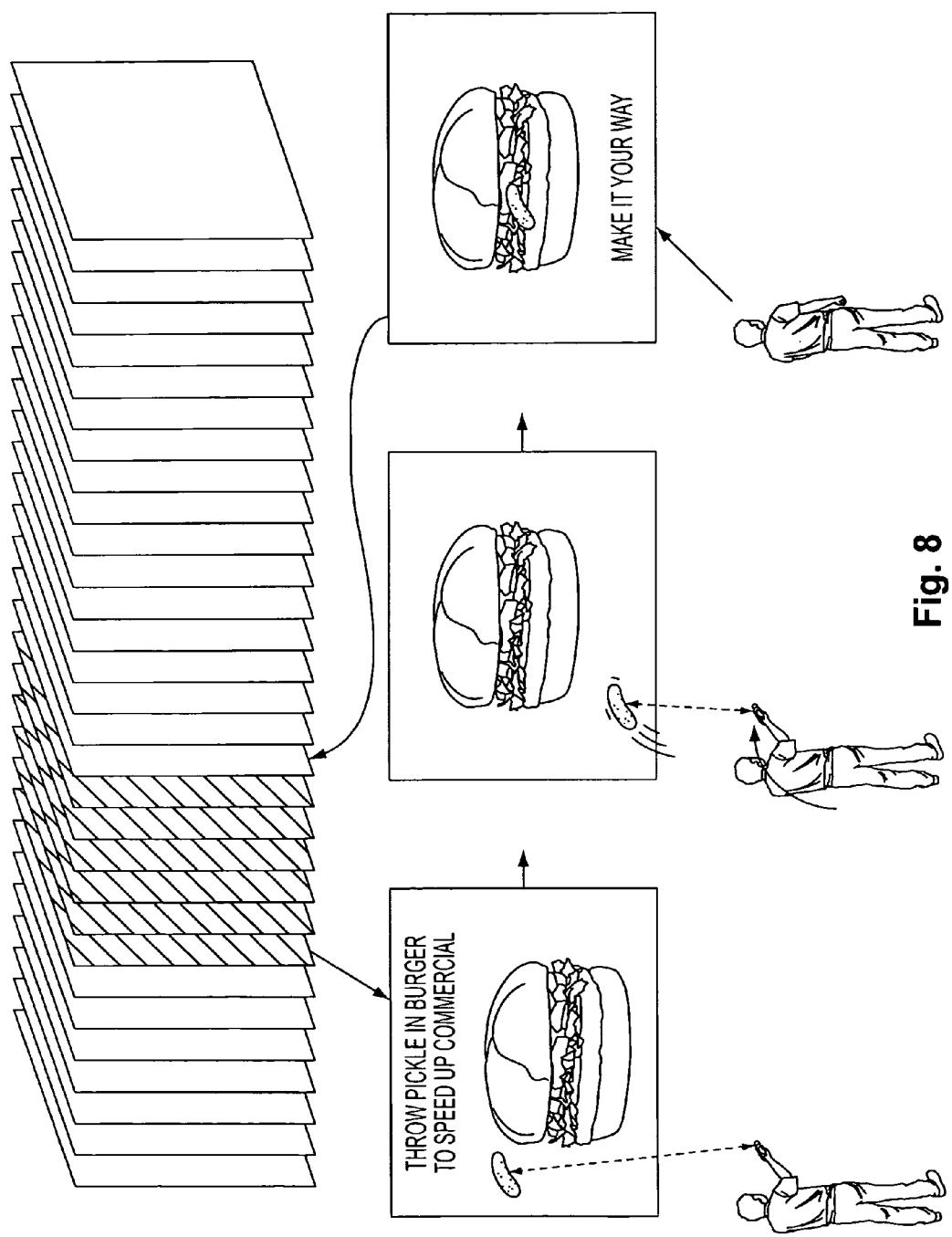
FIG. 8 illustrates the interaction of a user with a television commercial in accordance with one embodiment.

FIG. 8 illustrates the interaction of a user with a television commercial in accordance with one embodiment. Instructions are shown to the user at the beginning of the interactive television commercial. In the embodiment of FIG. 8, the instructions are "Throw the pickle to speed up commercial." The user, which is holding a one-handed controller with motion detection, swings his arm to simulate the act of throwing a pickle. As a result, the flying interactive pickle is placed in the burger, and the commercial message "Make it your way" is displayed briefly before the commercial ends and the user returns to watching the streaming media. In another embodiment, the user may use other inputs such as a hand motion which is captured by a camera, a clap of the hands to generate a sound input, a contact on a button of the controller, etc. In another embodiment, multiple input methods are available to the user for the same interaction and the user selects which one to use for participation. For example, the user chooses one of the options including pressing a button on a controller or remote control, clicking a mouse, entering text on a keyboard, speaking to a blue-tooth device in communication with the client device, waving a hand, etc.

Figure 9:
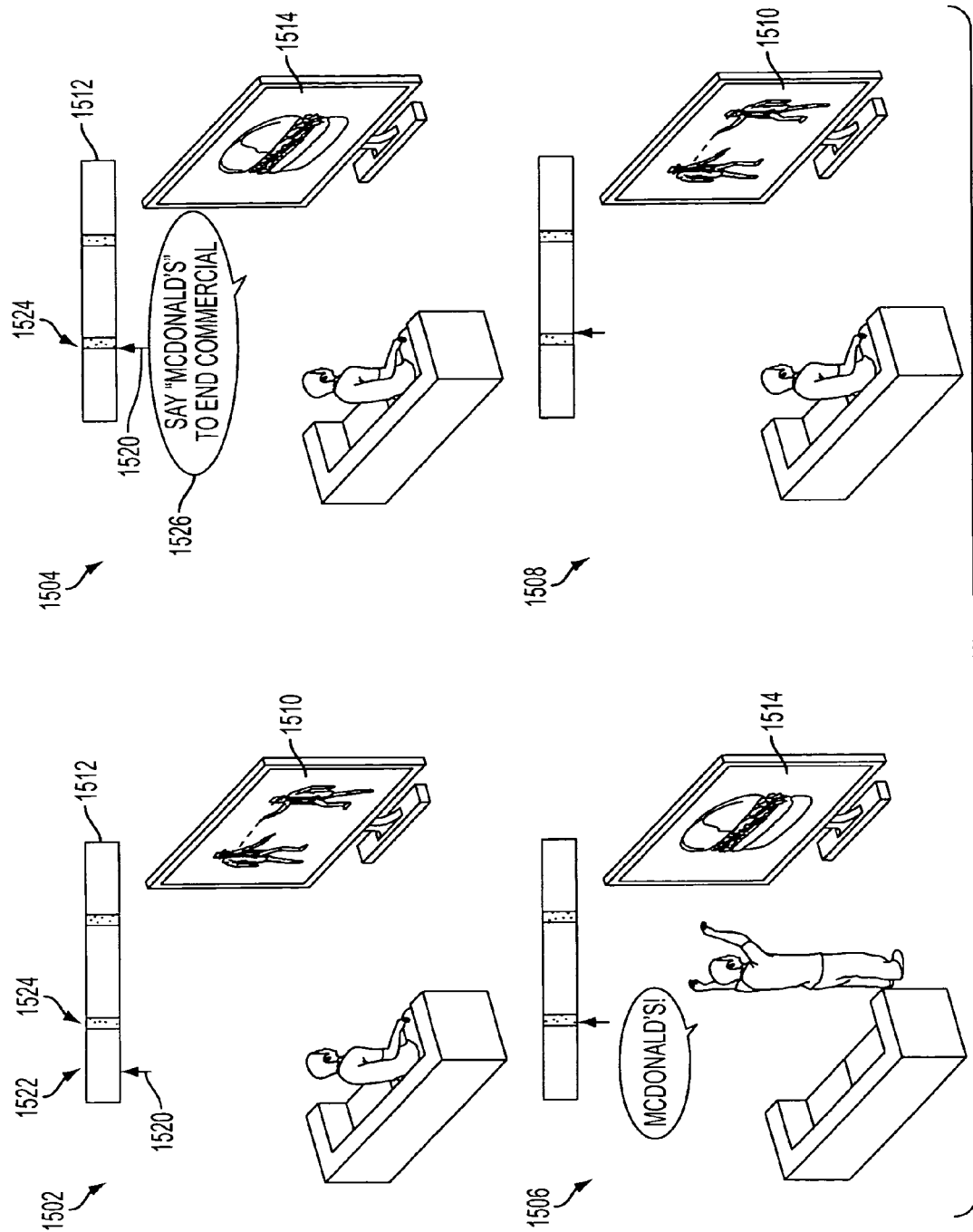
FIG. 9 illustrates a user interacting verbally with a commercial, according to one embodiment.

FIG. 9 illustrates a user interacting verbally with a commercial, according to one embodiment. In first capture 1502 of the sequence, a user is watching movie 1510. Progress pointer 1520 in progress bar 1512 shows that content 1522 display corresponds to a movie and that break 1524 is approaching. On second capture 1504, progress pointer 1520 shows that the movie has progressed to break 1524 for placing IC 1514. IC 1514 is interactive and instructions 1526 from the display ask the user to 'Say "McDonalds" to end commercial.' On third capture 1506, the user is saying "McDonalds!" The client device includes a microphone that captures the user's words and voice recognition on the device determines that the user has responded. The system then proceeds to skip the rest of the commercial, as shown on fourth capture 1508, where the user goes back to watch the movie. In one embodiment, the user gets rewarded with some points or a coupon from the sponsor. The rewards can be collected by the user in a variety of ways, such as receiving a coupon on the mail or via email, getting a text message in a mobile phone with the coupon, collecting points toward collecting prices in a web site, etc.

Figure 10:
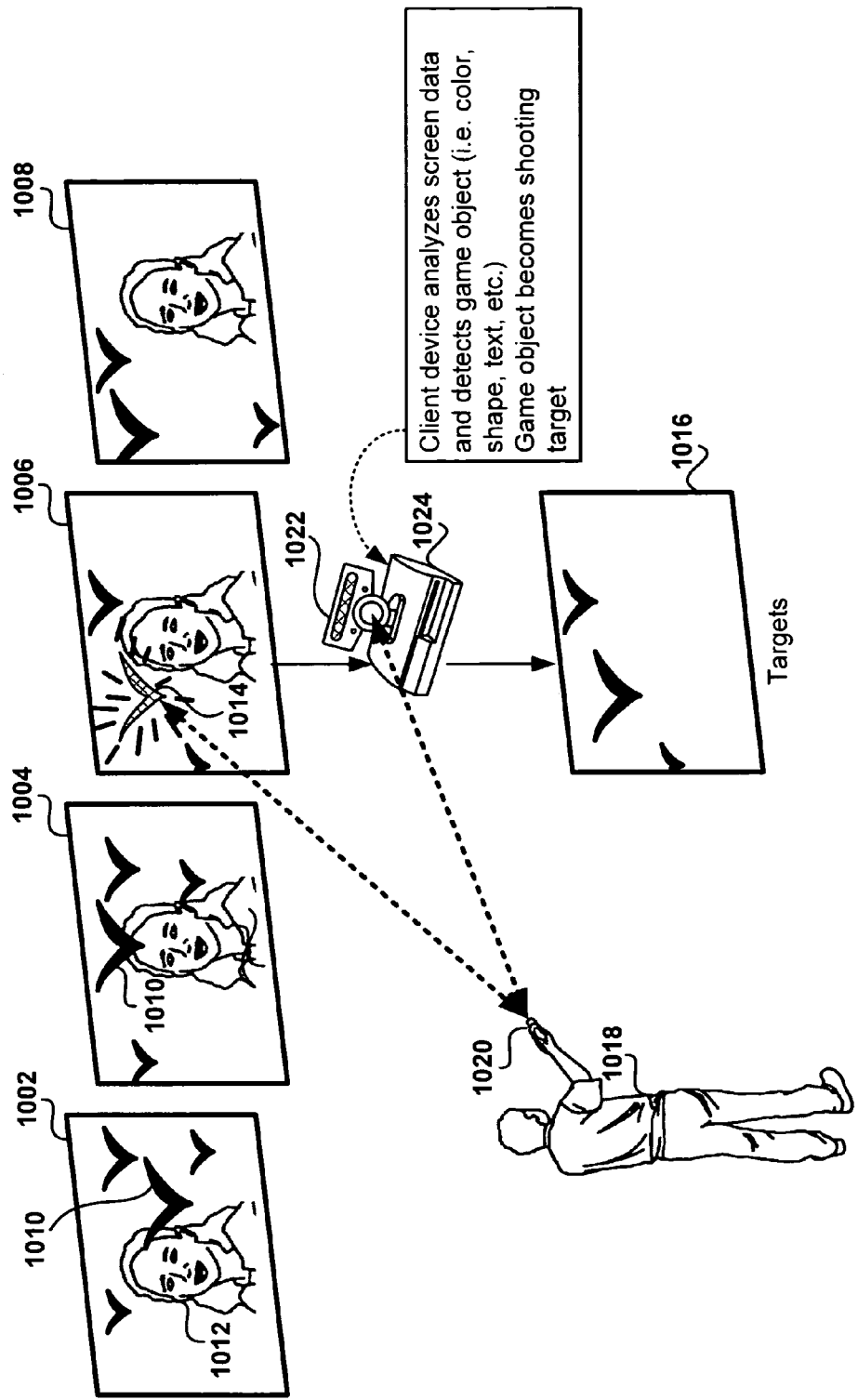
FIG. 10 shows interactive objects embedded in the media stream detected by the client device, according to one embodiment.

FIG. 10 shows interactive objects embedded in the media stream detected by the client device, according to one embodiment. A media segment, being displayed to user 1018, includes frames 1002, 1004, 1006, and 1008. Not all frames are shown for brevity of description with only a few sample frames shown. In one embodiment, the media segment is not interrupted to insert video frames and interactive objects are added or overlaid on top of the video frames. In another embodiment, game console 24 adds the interactive objects, such as flying birds 1010 in frame 1002, to the streamed video. Game console 1024 inserts the interactive objects upon instructions received from the interactive commercial server. The instructions can vary and can include from simple instructions to insert static objects, to more complex instructions including the location and movement of the interactive objects, the location of objects in the streamed media (allowing the interactive objects to be placed in front or behind movie objects), 3-D properties of the interactive objects, relative scaling of the objects, sounds, possible user inputs, object reactions to user inputs, etc.

In another embodiment, the interactive objects are already included in the video stream and game console 1024 receives instructions on how to detect these objects in the video frames. Some of the possible characteristics of detectable objects include color, shape, size, location on the screen, etc. For example, an interactive target may be detected by finding objects at a specific shade of gray, or a certain combination of colors in the pixelation of the object. In another example, the target is a black target located at a fixed location with specific horizontal and vertical coordinates.

In the embodiment shown in FIG. 10, interactive objects 1010 have been inserted by the interactive commercial server around actress 1012 in the video frame. Interactive objects 1010 are black and game console 1024 makes any black area in the screen over a certain minimum threshold size a target. Frame 1016 shows the target detected on frame 1006 by game console 1024. User 1018 holds a single handed controller with wireless communication to game console 1024. Additionally, video camera 1022 is used to detect the movement of the controller when user 1018 aims to the screen. At the push of a button, user 1018 fires onto the targets on the screen. If the firing hits a target, game console 1024 momentarily changes the color of interactive object 1014 to show a hit, or make the interactive object disappear or change location. A miss may also be indicated on the video screen by a distinctive mark such as a circle. A score (not shown) can be displayed to the user during the interactive commercial or at the end of the commercial to give the user feedback on his performance.

In another embodiment, the user is given a signal to indicate when the video display is interactive mode. The signal can include a banner on the screen ("shoot the birds now!"), a sound ("beep"), a LED lit on game console 1024, a LED or other type of light lit on controller 1020, a vibration of controller 1020, etc. In the embodiment of FIG. 10 the single handed controller has a spherical end that can be programmed to light up in different colors. In this case, controller 1020 glows with a white light when the video becomes interactive and then goes back to a non-illuminated state after the end of the interactive segment. In one embodiment, the spherical end flashes red every time the user hits a target on the screen.

Figure 11:
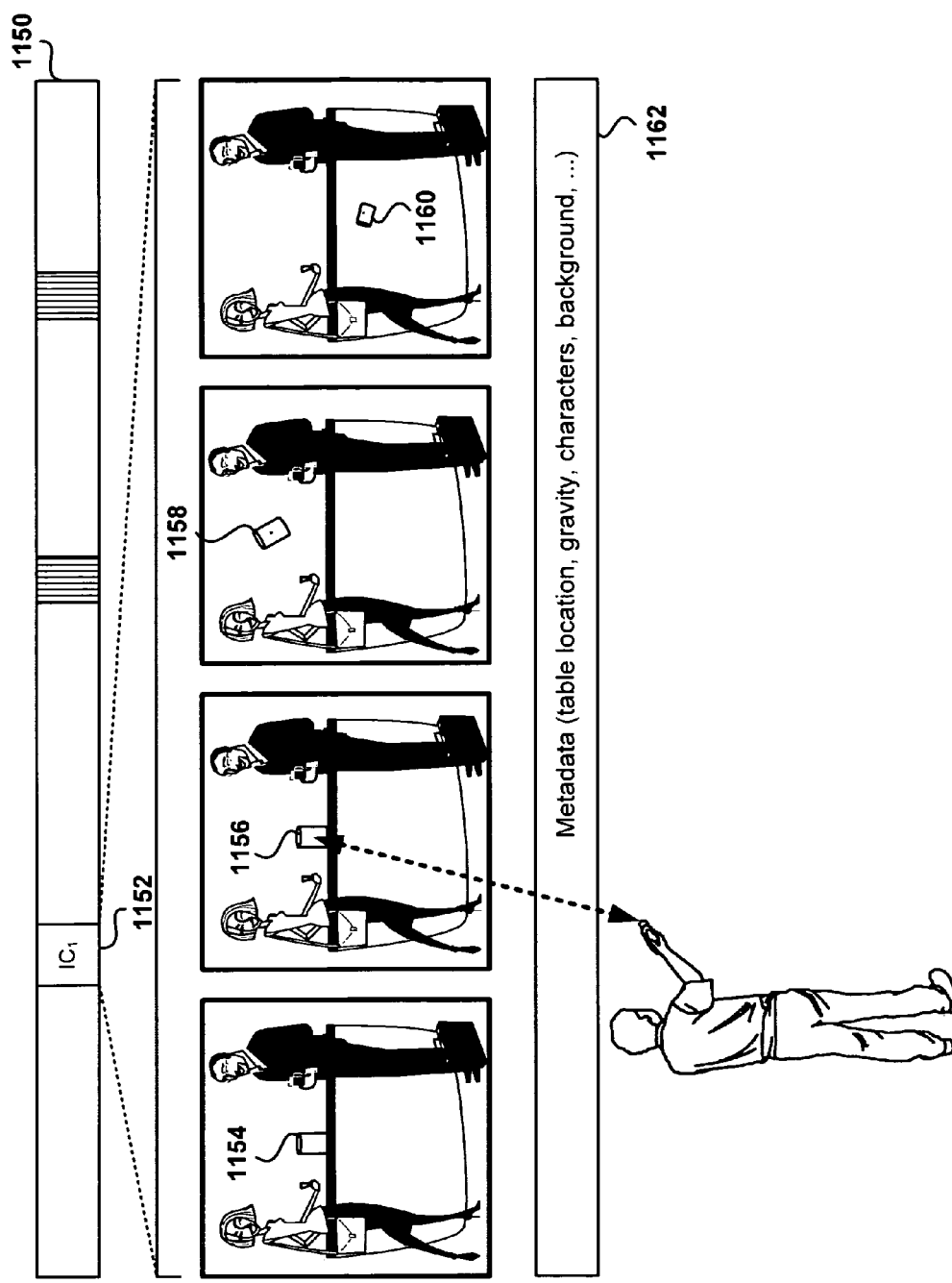
FIG. 11 illustrates the insertion of interactive objects at the client based on received object metadata, in accordance with one embodiment.

FIG. 11 illustrates the insertion of interactive objects at the client based on received object metadata, in accordance with one embodiment. Movie 1150 includes interactive commercial 1152, which includes a sequence of frames. Metadata 1162 is sent to the game console with information regarding interactivity objects to be overlaid on top the frames in movie 1150. Metadata 1162 also includes information about objects that are part of the movie, such as actors tables, glasses, the moon, the sun, light sources, direction of gravity, relative scaling of objects, camera angles, etc. With metadata information 1162 and the proper computer code for processing interactive objects, the game console places interactive objects on the screen to deliver a game to the user. In one embodiment, the movie objects can also become interactive. For example, a user can score points for shooting a warrior, or opening a door, or finding certain object on the screen, etc. In another embodiment, the movie object can even by manipulated by the game console to react to user input, such as making it disappear, changing its size or location, changing its color, etc.

In the embodiment shown in FIG. 11, movie 1150 is showing a scene at a bar where a man and a woman are talking and a table sits behind the actors. While the movie is showing, the client device places can 1154 on top of the table that becomes a shooting target. The player "hits" can 1156 in the second frame, that causes the can to fly away, as seen in can position 1158 of the third frame. In the last frame, can 1160 is falling to the ground. The client device reduces the size of can 1160 according to the perspective of the scene to show that the can has travelled away from the table after the impact. Further, the client device will place the can on the ground (not shown) according to the geometry of the room received in metadata 1162, which includes the floor plane as well as other objects that the can may hit as if flies away after the shot. Additionally, the characteristics of the can may change according to the game, such as adding a bullet hole every time the can is hit, adding additional point if the can is hit again in the air, etc.

In another embodiment, image recognition, as described in reference to FIG. 10, can be combined with metadata to provide interactivity to the game. For example, the movie may already include interactive objects when it is received by the client device, and the metadata indicates the frames in which gaming objects are embedded as well as the characteristics of the object, such as color, shape, etc. The client device scans the image for those characteristics in the metadata and then determines the location of the received embedded interactive objects.

Figure 12:
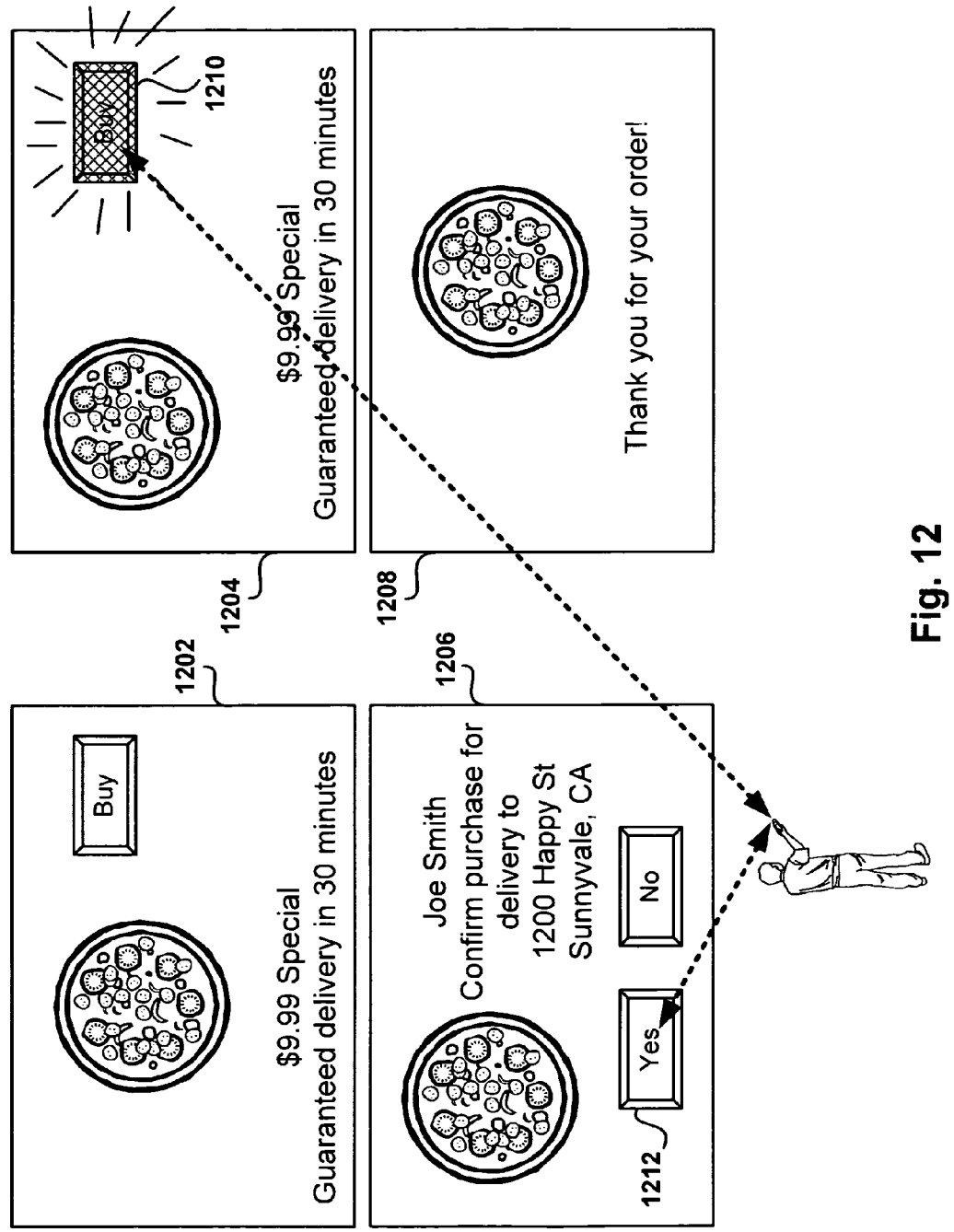
FIG. 12 shows an interactive television commercial with the option to purchase an item, according to one embodiment.

FIG. 12 shows an interactive television commercial with the option to purchase an item, according to one embodiment. In frame 1202, a frame at the beginning of the commercial, a commercial offer is presented to the player, in this case the purchase of a pizza for home delivery. In subsequent frame 1204, the player selects Buy button 1210 to request the purchase of the item. Upon receipt of the purchase request, the system retrieves the player address from a player information database, such as user database 304 of FIG. 3.

In frame 1206, the user is presented with the delivery address and the television commercial requests purchase confirmation from the player. At this time, the player selects button 1212 to confirm the purchase order. The system bills the player in a prearranged matter, such as charging it to a credit card or adding it to the user's cable TV bill. In another embodiment, the user is presented additional frames for entering payment information or delivery address information. In frame 1208, the user is presented with a confirmation of the order and a thank you for the purchase.

Since the purchase process may take more time than the one allocated for the commercial without a purchase, the user may not see some of the content following the commercial, such as when viewing a live broadcast. In one embodiment, the content is recorded in a DVR or similar device so the player does not miss content. After the purchase, the player resumes viewing at the next commercial, at the current commercial being shown, or at the continuation of the movie.

Figure 13:
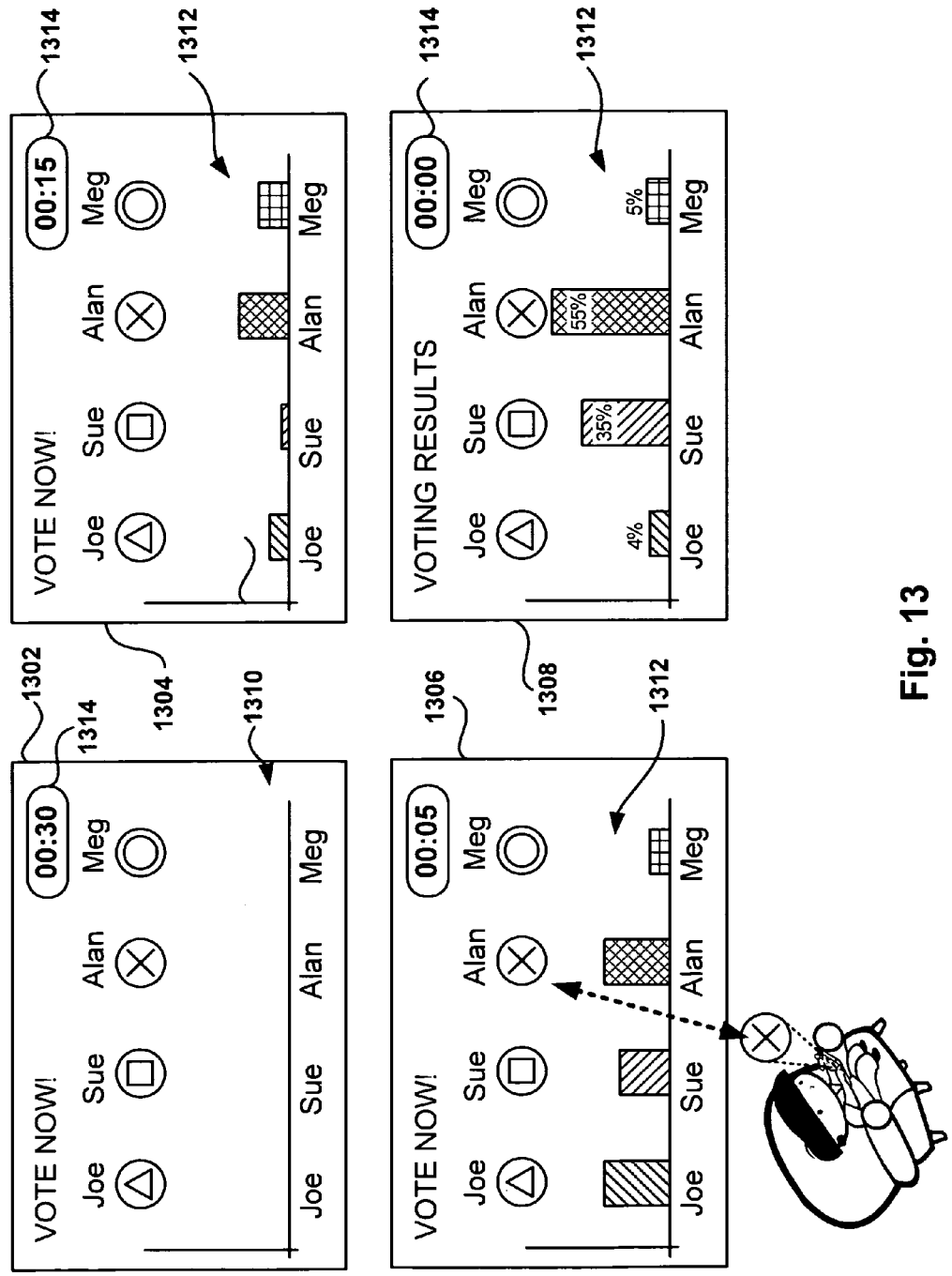
FIG. 13 illustrates a voting sequence according to one embodiment.

FIG. 13 illustrates a voting sequence according to one embodiment. A player is presented with several options for voting, such as selecting from a group of contestants or answering a trivia question. In frame 1302 the voting sequence starts. Clock 1314 indicates the amount of time that the player has for voting, which is 30 seconds in the example shown in FIG. 13. The name of the options, which in this example corresponds to contestants, are shown next to the button that will perform a vote for the corresponding contestant. In subsequent frame 1304, downward counting clock 1314 indicates that 15 seconds are left for voting and that a number of votes have already been casted. Histogram 1312 shows the distribution of votes up to that point in time. In another embodiment, histogram 1312 does not show the partial results until the end of the voting period to avoid influencing the votes of viewers.

The player viewing the interactive commercial has selected contestant Alan by pressing the X button in the two-handed game controller. Frame 1308 shows that the time for voting has expired with clock 1314 showing no time left for voting. Histogram 1312 shows the final results in bar form, as well as in numeric percentages for each option. In another embodiment, the voting period is large, such as 24 hours, and a single TV channel is dedicated to voting. Viewers that wish to vote can tune to the voting channel and cast their vote anytime within the voting period. In another embodiment, the voting channel may be a dedicated channel for voting. Viewers are giving options for entering one of many voting processes. For example, one of the options can be entering the intention of vote in a democratic election, thus creating voting forecasts for candidates. Once the user enters a selection, the corresponding voting process is started and the viewer can enter a vote as previously described.

It should be appreciated that the embodiment illustrated in FIG. 13 is an exemplary method for interactive voting. Other embodiments may utilize different fields, options, input methods, times allowed for voting, time to count the results, display of results, etc. The embodiment illustrated in FIG. 13 should therefore not be interpreted to be exclusive or limiting, but rather exemplary or illustrative.

Figure 14:
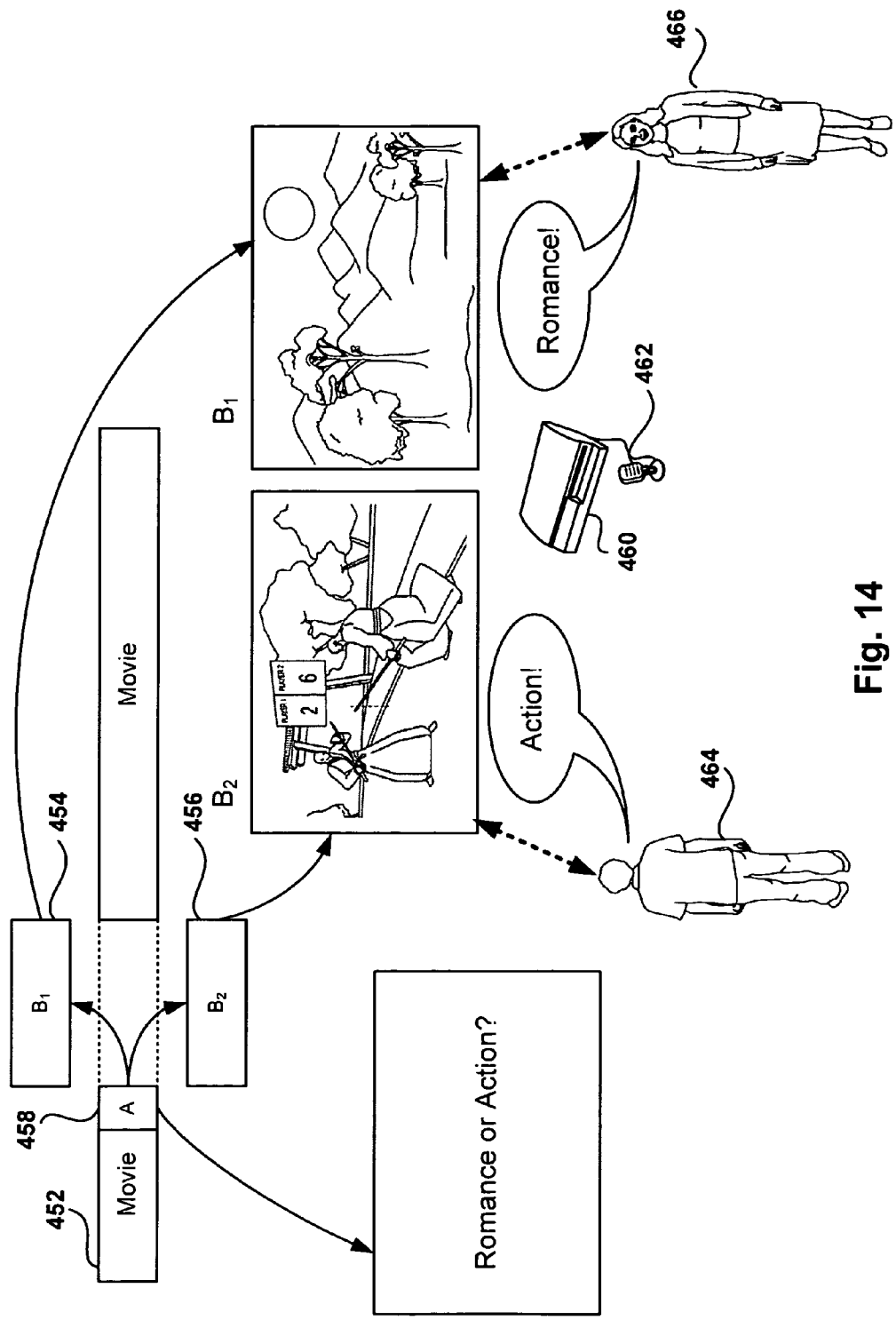
FIG. 14 illustrates the selection of different interactive content based on user input, according to one embodiment.

FIG. 14 illustrates the selection of different interactive content based on user input, according to one embodiment. Movie 452 is being watched by viewers 464 and 466 at different locations. Commercial A 458 is inserted in movie 458 to allow the viewer to select the type of commercial he or she would like to watch. In the embodiment shown in FIG. 14, the viewer is asked whether she prefers Romance or Action. Microphone 462 connected to console 460 allows the user to enter a voice command to perform the selection. In this case, viewer 464 says "Action" resulting in viewer 464 seeing commercial $B_2$, and viewer 466 says "Romance" resulting in viewer 466 seeing commercial $B_1$. Typically, commercials $B_1$ sand $B_2$ will have the same length, but in other embodiments the length of the commercials are independent and can be different.

If the viewer does not enter a selection, the system will select the commercial to show, which can be $B_1$, $B_2$ or a different commercial $B_3$ (not shown). The viewer can be offered many types of different choices, such as Coke or Pepsi, car or detergent, finance or eating or travel, etc. In one embodiment, a viewer that enters a choice is rewarded for participating, and the reward can be a shorter commercial, fewer commercials, bonus points, etc.

Figure 15:
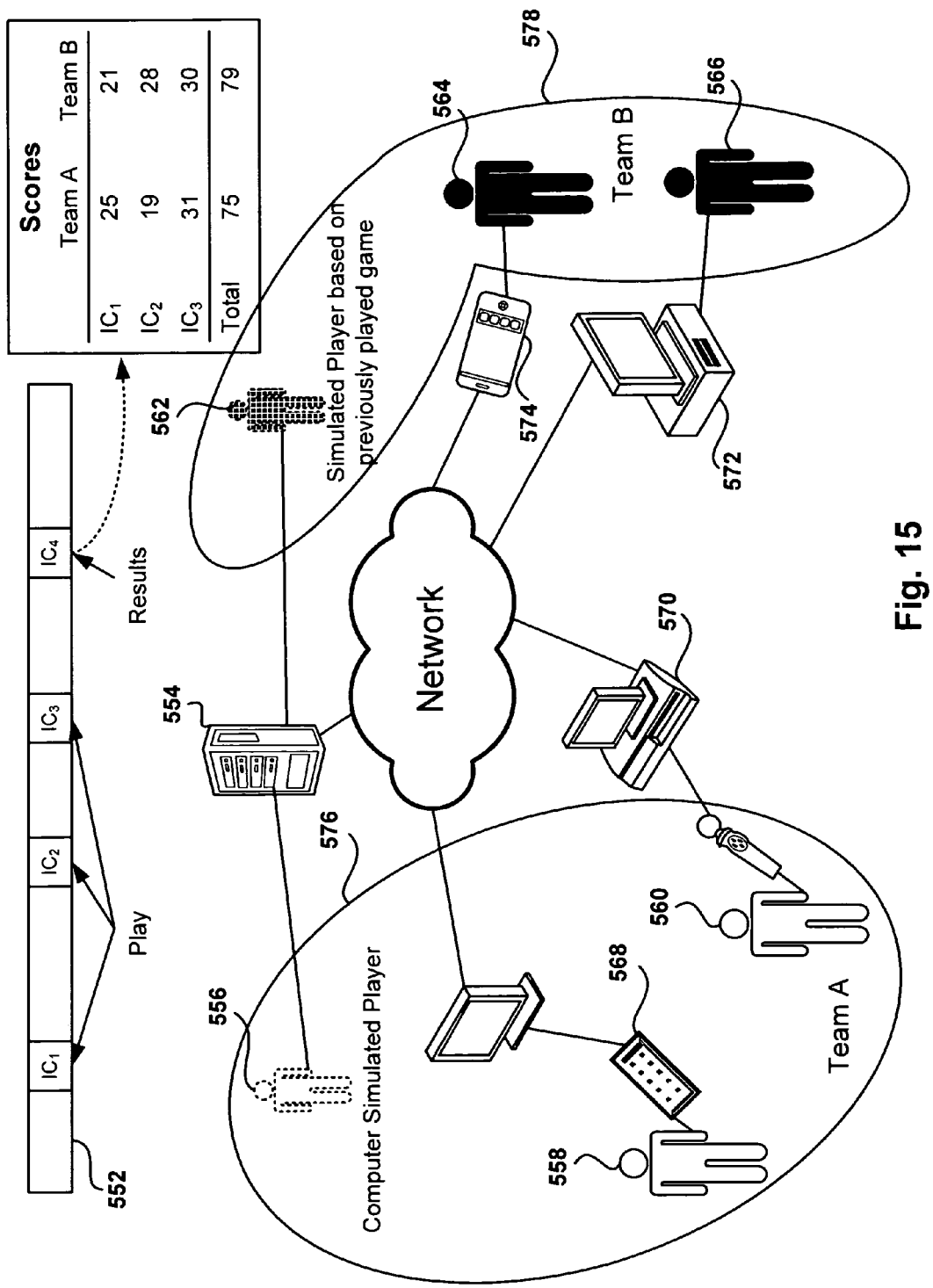
FIG. 15 depicts teams competing in an interactive broadcast game, in accordance with one embodiment of the invention.

FIG. 15 depicts teams competing in an interactive broadcast game, in accordance with one embodiment of the invention. Media segment 552 includes 4 interactive commercials embedded $IC_1$-$IC_4$. In the embodiment of FIG. 15, the first three interactive commercials are three chapters of a game. $IC_4$ is used to display the aggregated results.

The players are organized in teams to compete against each other. In the embodiment of FIG. 15, team A 576 is playing against team B 578. The teams can be organized by subscription (players choose a team to join), by characteristics of the players, at random, etc. The characteristics of the player can vary across a multitude of dimensions, such as age group, city of residence, state, university, sex, marital status, national origin, ethnicity, etc. In some cases the game can be played "mano a mano," that is, one team against another team. In other cases, multiple teams play simultaneously against the rest of the teams, and the final scores are tabulated to display the winning order.

The interactive commercials $IC_1$-$IC_4$ form a playing sequence. In one embodiment playing sequence forms a continuous game that is played in several phases. That is, each interactive game starts exactly where the previous interactive game stopped. In other cases, the interactive commercials are almost independent from each other. For example, each interactive commercial corresponds to a different circuit in a car race or to a different event in a triathlon.

The team scores can be calculated using a variety of methods. In one embodiment, the team score corresponds to the sum of all the individual scores of players in the team. In other embodiments, the team score can be an average team score, the average of the best top-ten scores, the median team score, etc. Interactive server 554 manages the distribution of interactive commercials and collects individual results to compute the complete results. The team scores can be shown during play, or can be shown only at the end of the individual play.

Further, the interactive commercials can be played exactly at the same time, such as in the case of a TV broadcast, or can be played at different times by each of the players. In this latter case, the team scores are not computed until the period allowed for playing the interactive games ends.

In one embodiment, players can be added to a team that are computer simulated players 556, or that are based on a previously played game that has been recorded by the system, such as player 562. In another embodiment, when a player whishes to compete against another player, but no competitor is available, the player can compete against computer simulated player 556, or against simulated player 562. To avoid competitor monotonous behavior, simulated player 562 can be chosen at random or based on skill level from a database of previously played and recorded games.

As seen in FIG. 15, the interactive commercials are designed to support multiple computing devices and input methods. For example, players can use TV remote control 558, game console 570, personal computer 572, mobile phone 574, etc. In one embodiment, system 554 may adjust the complexity and scoring of the interactive commercials according to the user computing platform because some platforms are less responsive than others and the input devices may adapt better for game playing. For example in a racing game, it is easier to steer a car with a dedicated gaming steering wheel than with arrow keys in a keyboard or remote control.

Figure 16:
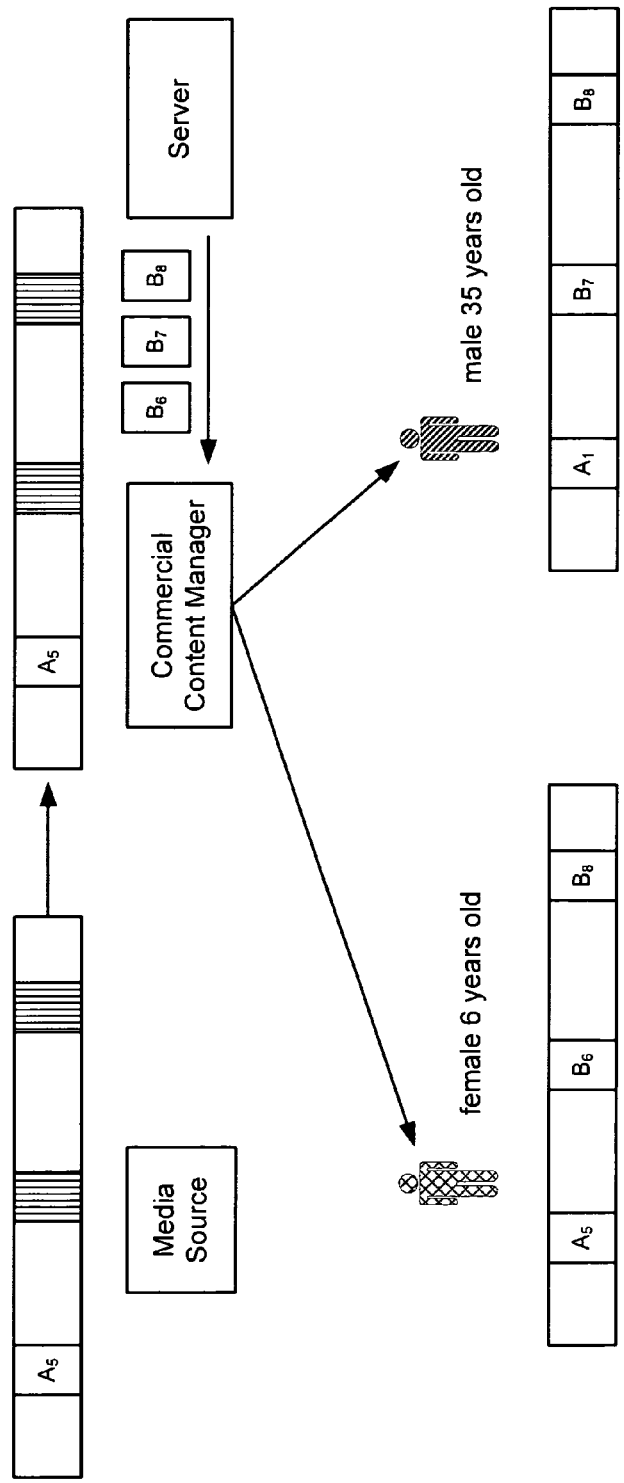
FIG. 16 depicts an embodiment for introducing interactive advertising based on demographics.

FIG. 16 depicts an embodiment for introducing interactive advertising based on demographics. Two different users are downloading content simultaneously, a 6-year old girl, and a 35-year old male. The content may be identical or may be different, may be from the same source or from a different source. The Supplemental Content Manager inserts IC $B_6$ and $B_8$ for the girl, and $B_7$ and $B_8$ for the male. IC Manager uses a dynamic algorithm for ad delivery scheduling to determine which IC to deliver. In this case, $B_8$ is suitable for all ages, while $B_6$ is targeted to children and $B_7$ is targeted to males over 30.

Figure 17:
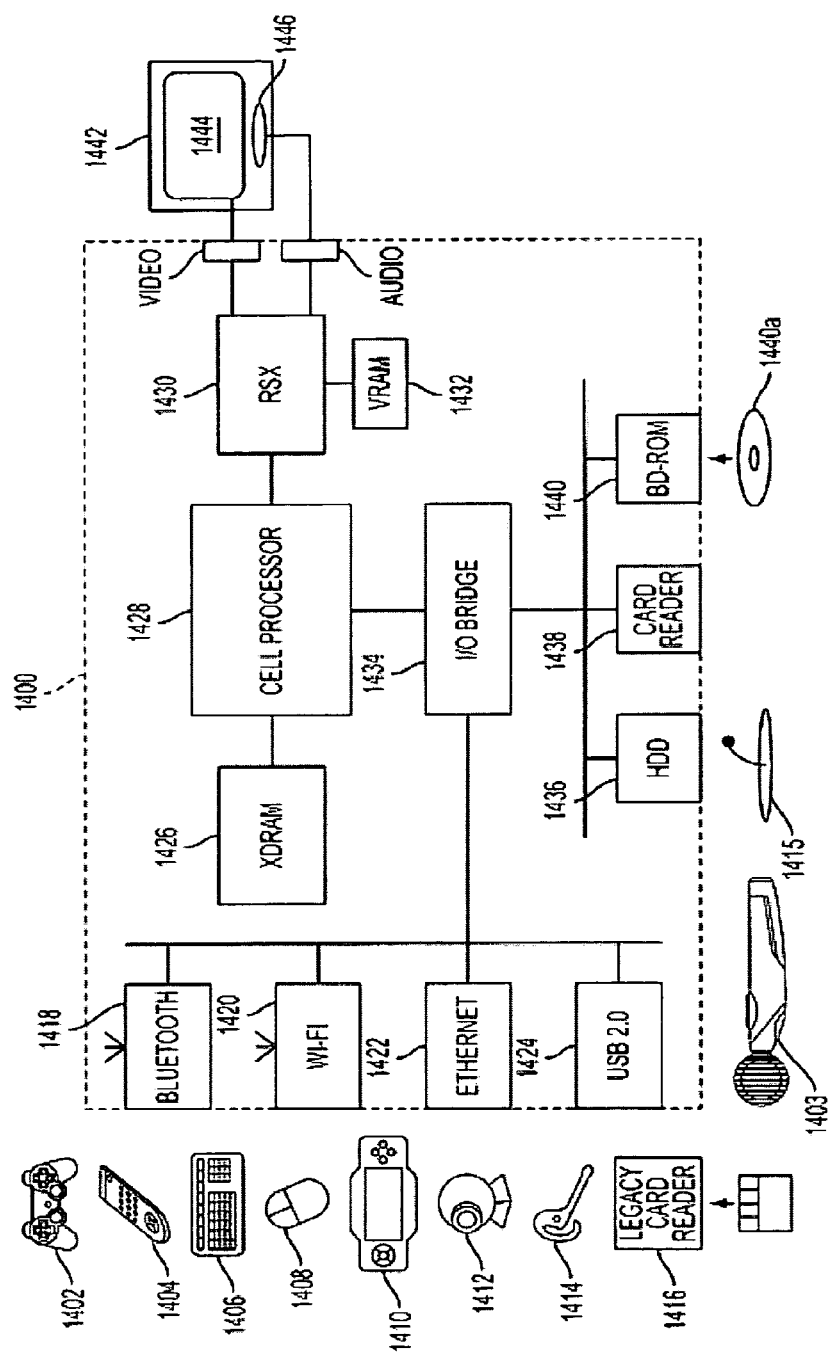
FIG. 17 illustrates hardware and user interfaces that may be used to determine controller location, in accordance with one embodiment of the present invention.

FIG. 17 illustrates hardware and user interfaces that may be used to determine controller location, in accordance with one embodiment of the present invention. FIG. 17 schematically illustrates the overall system architecture of the Sony® Playstation 3® entertainment device, a console that may be compatible for interfacing a control device with a computer program executing at a base computing device in accordance with embodiments of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 18:
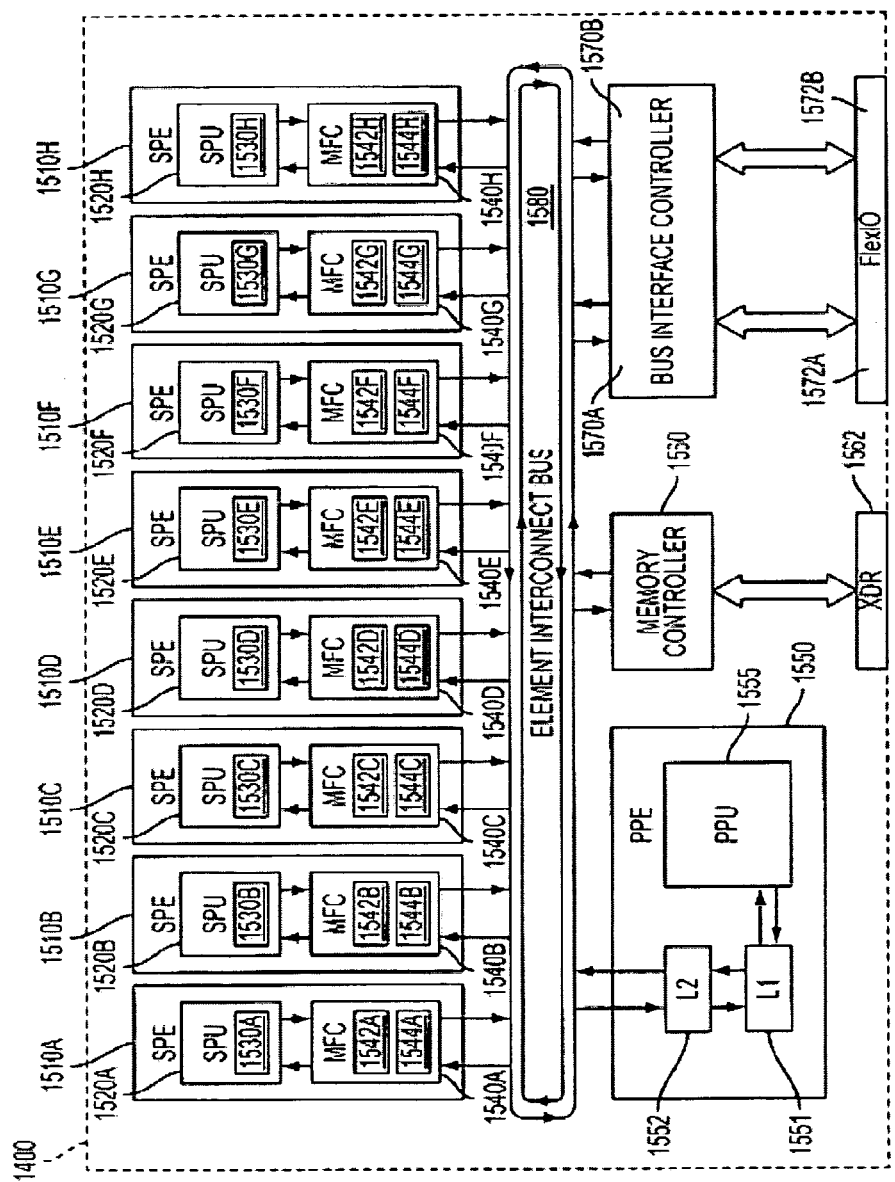
FIG. 18 illustrates additional hardware that may be used to process instructions, in accordance with one embodiment of the present invention.

FIG. 18 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RIIC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Figure 19:
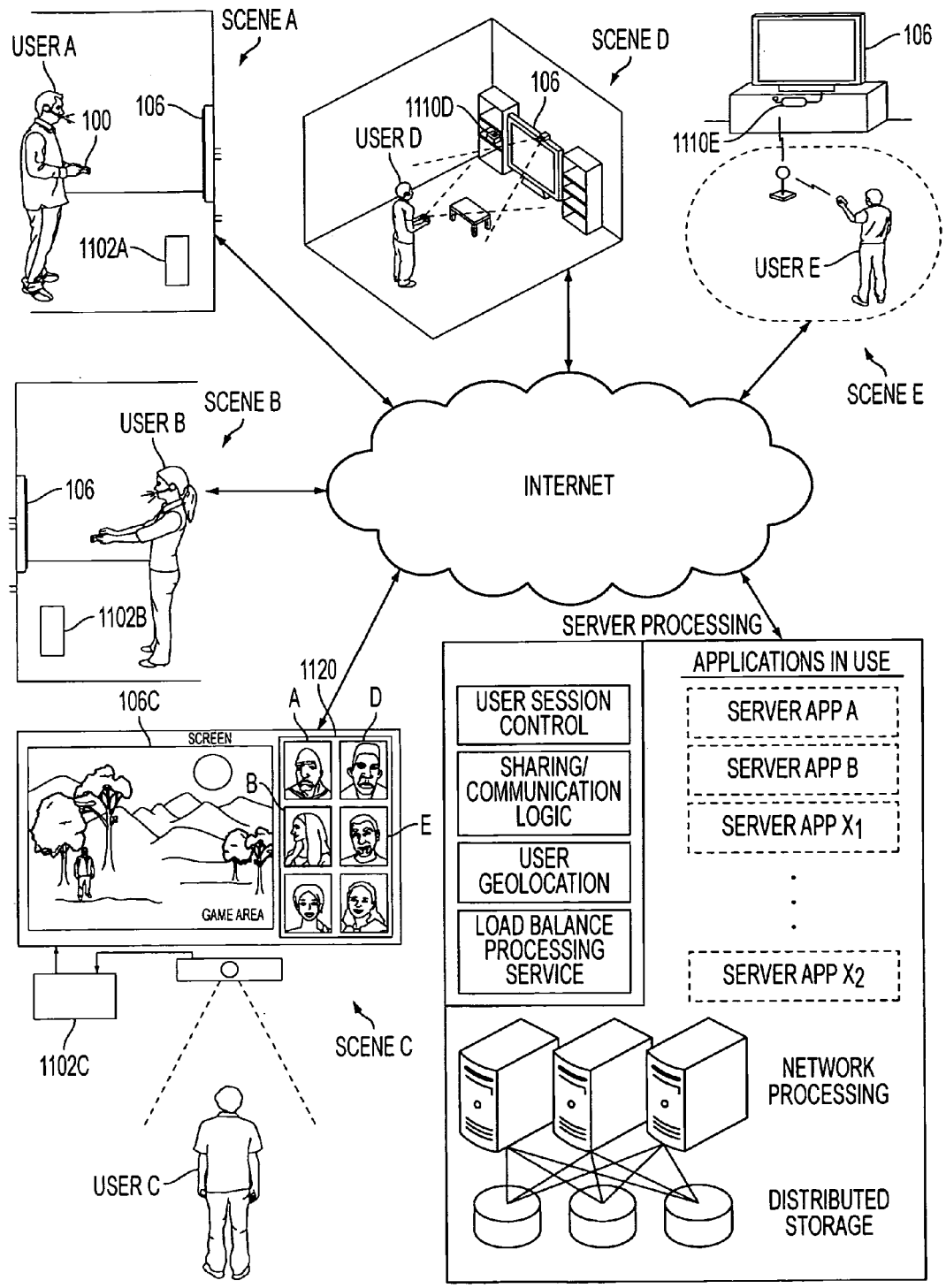
FIG. 19 is an exemplary illustration of scene A through scene E with respective user A through user E interacting with game clients 1102 that are connected to server processing via the internet, in accordance with one embodiment of the present invention.

FIG. 19 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 19, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 19 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 19, the server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 20:
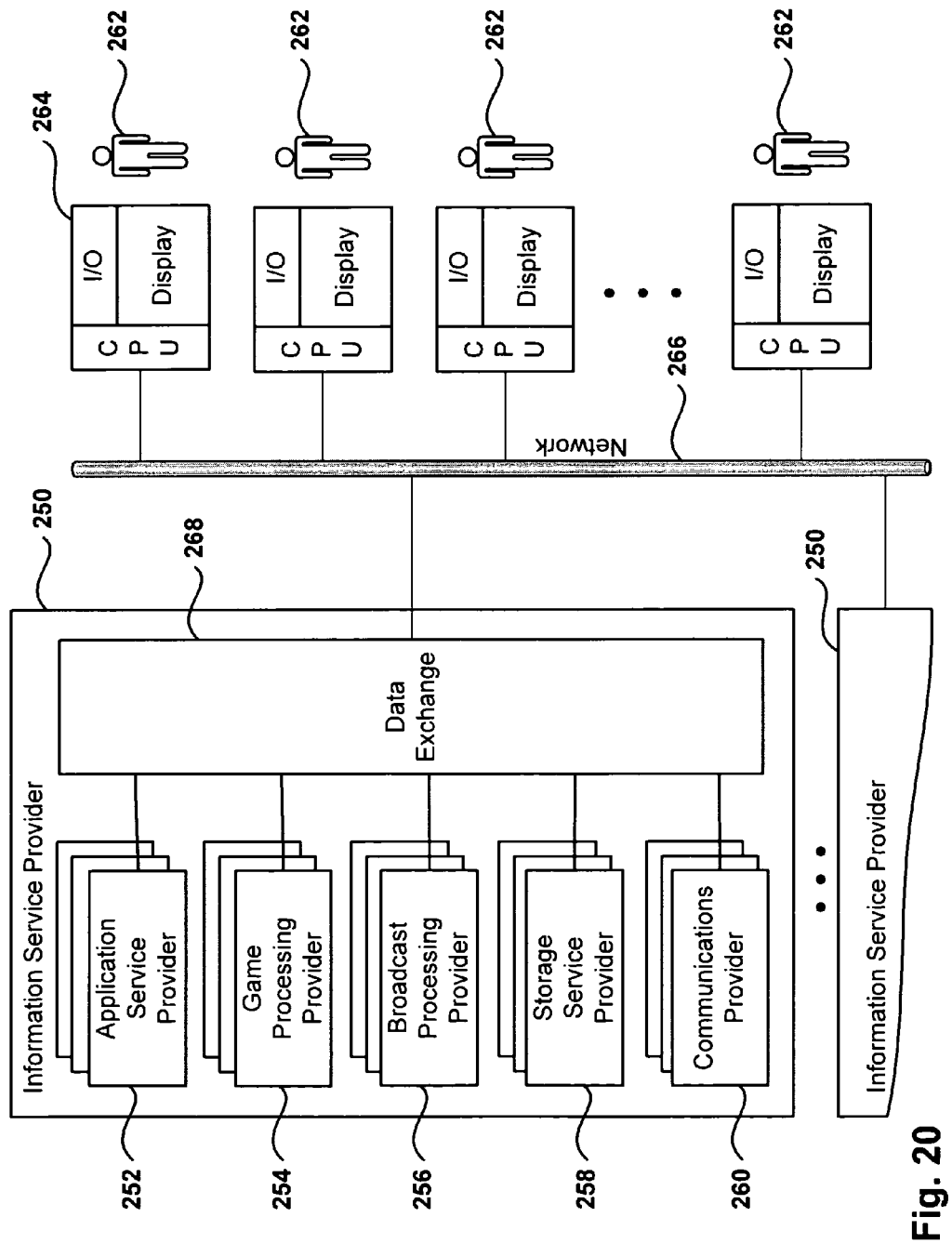
FIG. 20 illustrates an embodiment of an Information Service Provider architecture.

FIG. 20 illustrates an embodiment of an Information Service Provider architecture. Information Service Providers (ISP) 250 delivers a multitude of information services to users 262 geographically dispersed and connected via network 266. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 250 includes Application Service Provider (ASP) 252, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 250 includes a Game Processing Server (GPS) 254 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 256 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 258 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 260 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 268 interconnects the several modules inside ISP 253 and connects these modules to users 262 via network 266. Data Exchange 268 can cover a small area where all the modules of ISP 250 are in close proximity, or can cover a large geographic area when the different modules are geographically dispersed. For example, Data Exchange 268 can include a fast Gigabit Ethernet (or faster) within a cabinet of a data center, or an intercontinental virtual area network (VLAN).

Users 262 access the remote services with client device 264, which includes at least a CPU, a display and I/O. The client device can be a PC, a mobile phone, a netbook, a PDA, etc. In one embodiment, ISP 250 recognizes the type of device used by the client and adjusts the communication method employed. In other cases, client devices use a standard communications method, such as html, to access ISP 250.

It should be appreciated that the embodiment illustrated in FIG. 20 is an exemplary ISP architecture. Other embodiments may utilize different modules, or may arrange the modules in varying manners. The embodiment illustrated in FIG. 20 should therefore not be interpreted to be exclusive or limiting, but rather exemplary or illustrative.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method executed by a processor for delivering interactive multimedia content, the method comprising:
  obtaining a media segment lacking interactive capabilities, the media segment being defined for presentation at a display;
  obtaining an interactive package containing interactivity instructions for adding interactive functions to the media segment, the interactivity instructions including player input processing instructions, instructions for adding additional display elements to the media segment, and information regarding native objects in the media segment lacking interactive capabilities, wherein the native objects are not defined for interactive play in the media segment and the interactivity instructions enable the interactive play with the native objects;

combining the media segment with the interactive package to obtain an interactive segment which responds to player input;

displaying the interactive segment while checking for the player input; and dynamically updating the interactive segment being displayed in response to the player input, wherein operations of the method are executed through the processor.

2. The method as recited in claim 1, wherein combining the media segment further includes:

inserting an interactive game between at least two video frames of the media segment.

3. The method as recited in claim 1, wherein the interactive package includes one or more of a video clip, an audio clip, an object definition, insertion instructions, programming instructions, input types, input processing, input responses, random elements, inter-player communication, and server identification.

4. The method as recited in claim 1, wherein combining the media segment further includes:

adding game objects to video frames of the media segment, the game objects being defined for interaction with the player.

5. The method as recited in claim 1, wherein the interactive segment includes a game selected from a group consisting of a target shooting game, a ball throwing game, a ball hitting game, a fighting game, or a racing game.

6. The method as recited in claim 1, wherein the interactive segment includes choosing an action, the action selected from a group consisting of buying an item, voting on the media segment, voting on the interactive segment, or selecting an option from a multiple-choice question.

7. The method as recited in claim 1, wherein the interactivity instructions include:

information regarding a location of the native objects in the media segment; and information regarding interactive objects absent from the media segment to be displayed together with the native objects, wherein the native objects and the interactive objects are responsive to the player input.

8. The method as recited in claim 1, wherein the interactivity instructions include information regarding a location of the native objects in the media segment.

9. The method as recited in claim 1, wherein dynamically updating the interactive segment further includes:

selecting a segment of interactive media from a plurality of segments based on the player input, wherein displaying the interactive segment includes displaying the selected segment.

10. The method as recited in claim 9, where the plurality of segments include a segment that enables a player to enter input to end display of a commercial early before an end of the commercial.

11. The method as recited in claim 1, further including:

assigning a reward to the player based on player interaction with the interactive segment.

12. The method as recited in claim 11, further including: transmitting the reward to a mobile device.

13. The method as recited in claim 11, wherein the reward includes skipping a future commercial during the displaying of the interactive segment.

14. The method as recited in claim 1, wherein combining the media segment further includes:

taking a picture of the player; and adding an image of the player based on the picture to the media segment.

15. A client device for delivery of interactive multimedia content, the client device comprising:

a commercial content manager that receives an interactive package from an interactive content server, the interactive package containing interactivity instructions for adding interactive functions to a media segment, the interactivity instructions including player input processing instructions and instructions for adding additional display elements to the media segment;

a content manager that receives the media segment without interactive capabilities, wherein the content manager combines the media segment with the interactive package to obtain an interactive segment responsive to player input; and a display manager that shows the interactive segment while checking for the player input, wherein the content manager dynamically updates the interactive segment being displayed in response to the player input, wherein the interactive segment is a multiplayer game where players play each other.

16. The client device of claim 15, further including:

a user interface manager that receives input from the player via one peripheral selected from a group consisting of a game controller, a camera, an infrared remote control, a blue tooth device, a microphone, a mouse, a keyboard, or a floor pad.

17. The client device of claim 16, wherein the user interface manager receives voice commands from the player.

18. The client device of claim 16, further including:

a controller with light emitting capabilities, wherein the user interface manager communicates with the controller, wherein the controller emits a predetermined light color to indicate that the client is in interactive mode.

19. An interactive content server for delivery of interactive multimedia content, the interactive content server comprising:

a user manager that receives a request from a client device for an interactive package that contains interactivity instructions for adding interactive functions to a media segment lacking interactive capabilities, the interactivity instructions including player input processing instructions and instructions for adding additional display elements to the media segment;

a commercial manager that selects an interactive package to be sent to the user; and a commercial delivery administrator that sends the selected interactive package to the user, wherein the commercial manager coordinates the display of the interactive package contemporaneously at additional client devices, wherein the client device and the additional client devices facilitate an interactive multiplayer game where players play each other.

20. The interactive content server of claim 19, wherein the interactive multiplayer game is a team game where two or more teams compete, wherein the user manager compiles team scores which are sent to the client device and the additional client devices.

21. The interactive content server of claim 19, wherein at least one player is simulated by the user manager based on previously played games.

22. The interactive content server of claim 19, wherein the interactive package is customized according to demographic characteristics of a player sending the request.

23. The interactive content server of claim 19, wherein the commercial manager selects additional interactive packages to create a plurality of interactive passages that are combined with the media segment to be displayed at different times at the client device.

24. The interactive content server of claim 23, wherein the additional interactive packages form a sequence for playing a game.

25. A computer program embedded in a non-transitory computer-readable storage medium, when executed by one or more processors, for delivering interactive multimedia content, the computer program comprising:
   program instructions for obtaining a media segment lacking interactive capabilities, the media segment being defined for presentation at a display;
   program instructions for obtaining an interactive package containing interactivity instructions for adding interactive functions to the media segment, the interactivity instructions including player input processing instructions and instructions for adding additional display elements to the media segment;
   program instructions for combining the media segment with the interactive package to obtain an interactive segment which responds to player input, wherein the interactive segment is a multiplayer game where players play each other;
   program instructions for displaying the interactive segment while checking for the player input; and
   program instructions for dynamically updating the interactive segment being displayed in response to the player input.

26. The computer program as recited in claim 25, wherein at least one player in the multiplayer game is simulated.

27. The computer program as recited in claim 26, wherein the simulated game corresponds to a previously played game.

28. A method executed by a processor for converting television commercials into interactive network video games, the method comprising:
   obtaining a television program lacking interactive capabilities;
   obtaining a television commercial which includes an interactive network video game;
   obtaining instructions for adding the television commercial to the television program;
   combining the television program with the television commercial according to the instructions to obtain an interactive segment responsive to player input; and
   displaying the interactive segment to enable a user to play the interactive network video game, wherein the interactive segment is operable to receive user input to end display of the interactive segment early before an end of the interactive segment when the user input is not received, wherein operations of the method are executed through the processor.

29. The method as recited in claim 28, wherein the instructions cause the television commercial to be inserted between two consecutive frames in the television program.

30. The method as recited in claim 28, wherein the instructions cause the combining to overlay the interactive network video game on top of a plurality of consecutive frames of the television program.

31. The method as recited in claim 28, wherein the instructions include:
   metadata information regarding a location of native objects in the television program; and
   metadata information regarding interactive objects to be displayed together with the native objects, wherein the interactive objects are responsive to the player input.

32. The method as recited in claim 28, wherein the interactive network video game is played in several game segments, wherein each of the several segments is inserted in a different place within the television program.

* * * * *